324-   CROSS REFERENCE   SEARCH ROOM

INVENTORS
STANLEY C. FRALICK
JOHN K. KNOX-SEITH
DENNIS L. WILSON
BY John L. Lawler
ATTORNEY

ADAPTIVE PATTERN RECOGNITION SYSTEM

Filed Jan. 11, 1965 9 Sheets-Sheet 2

INVENTORS
STANLEY C. FRALICK
JOHN K. KNOX-SEITH
DENNIS L. WILSON
BY John F. Lawler
ATTORNEY

ADAPTIVE PATTERN RECOGNITION SYSTEM

Filed Jan. 11, 1965

INVENTORS
STANLEY C. FRALICK
JOHN K. KNOX-SEITH
DENNIS L. WILSON

BY John F. Lawler
ATTORNEY

ADAPTIVE PATTERN RECOGNITION SYSTEM

Filed Jan. 11, 1965

9 Sheets-Sheet 4

INVENTORS
STANLEY C. FRALICK
JOHN K. KNOX-SEITH
DENNIS L. WILSON

BY John F. Lawler
ATTORNEY

ADAPTIVE PATTERN RECOGNITION SYSTEM
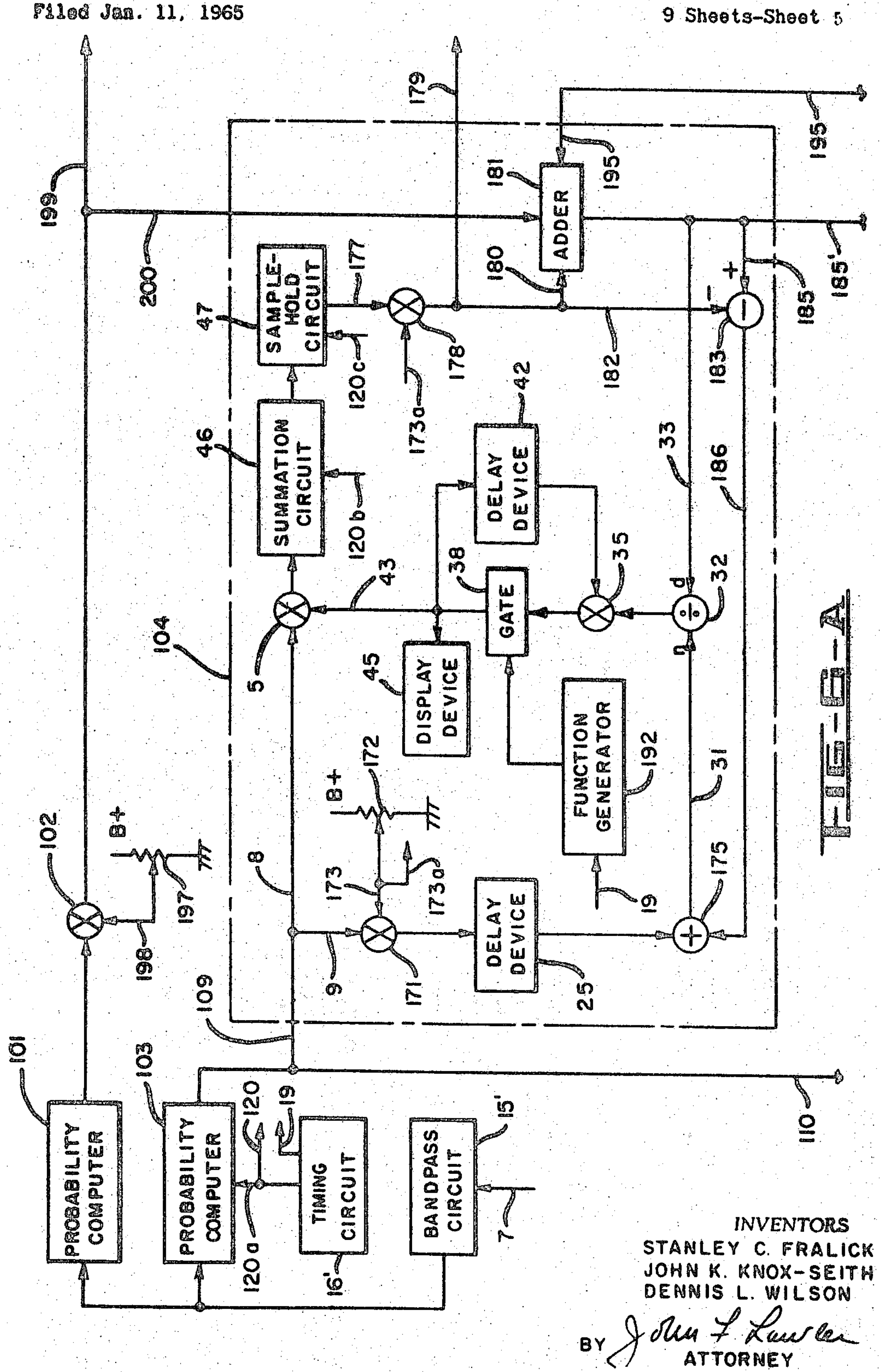
FIG-6-A
INVENTORS
STANLEY C. FRALICK
JOHN K. KNOX-SEITH
DENNIS L. WILSON
BY John F. Lawler
ATTORNEY

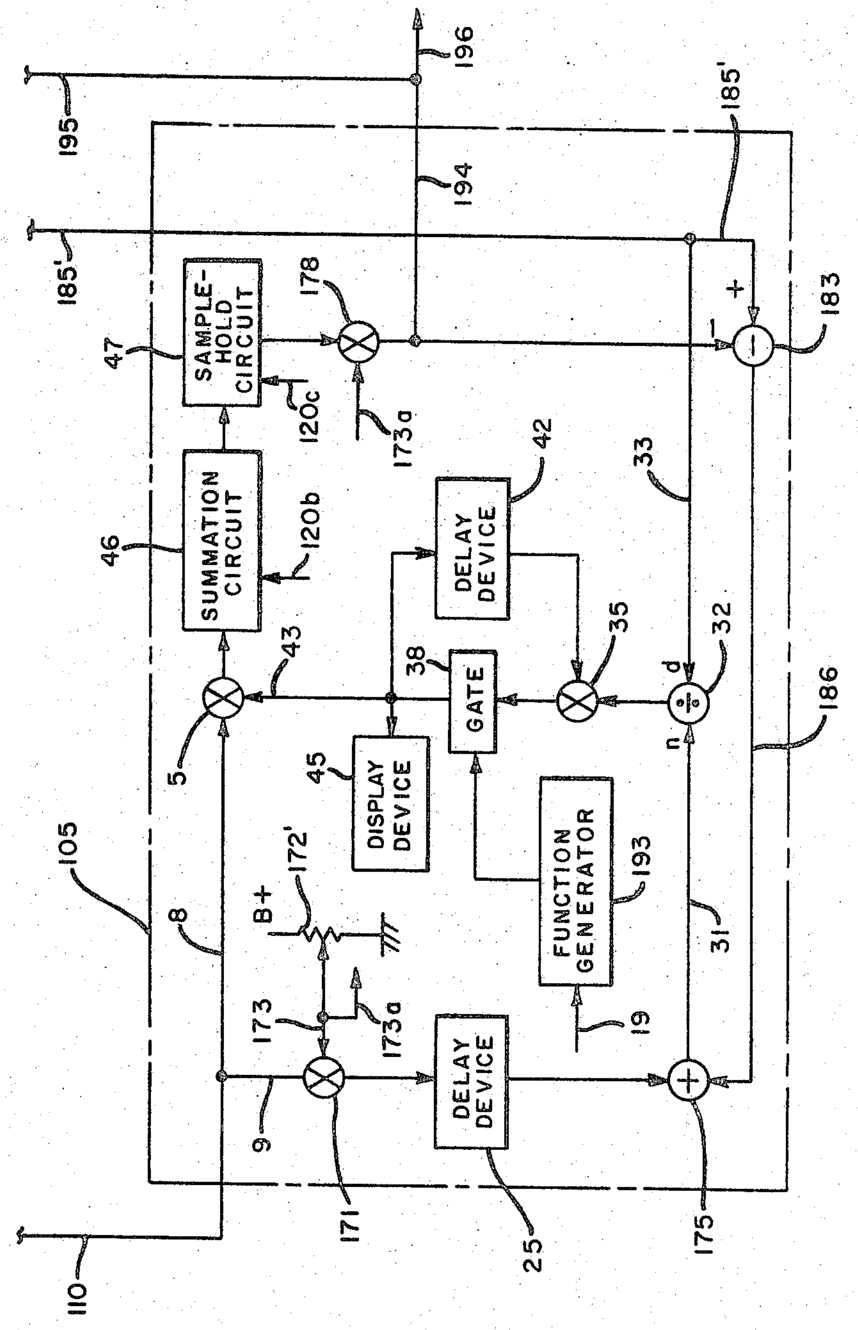
FIG-6-B
INVENTORS
STANLEY C. FRALICK
JOHN K. KNOX-SEITH
DENNIS L. WILSON
BY John F. Lawler
ATTORNEY

INVENTORS
STANLEY C. FRALICK
JOHN K. KNOX-SEITH
DENNIS L. WILSON

BY John F. Lawler
ATTORNEY

INVENTORS
STANLEY C. FRALICK
JOHN K. KNOX-SEITH
DENNIS L. WILSON

BY [signature]
ATTORNEY

ADAPTIVE PATTERN RECOGNITION SYSTEM

INVENTORS
STANLEY C. FRALICK
JOHN K. KNOX-SEITH
DENNIS L. WILSON
BY John F. Lawler
ATTORNEY

United States Patent Office 3,484,746
Patented Dec. 16, 1969

3,484,746

ADAPTIVE PATTERN RECOGNITION SYSTEM

Stanley C. Fralick, Sunnyvale, John K. Knox-Seith, Palo Alto, and Dennis L. Wilson, Menlo Park, Calif., assignors to Sylvania Electric Products Inc., a corporation of Delaware Filed Jan. 11, 1965, Ser. No. 424,491
Int. Cl. G06k 9/00
U.S. Cl. 340—146.3 17 Claims

ABSTRACT OF THE DISCLOSURE

This system sequentially operates on portions or observation units of an input signal to indicate whether a current observation unit contains a prescribed signal. The system comprises the series combination of a first likelihood computer, a learning loop and a decision circuit. The first computer includes a periodogram calculator which divides the input signal into a sequence of observation units. The learning loop comprises a second likelihood computer, a third probability computer and a multiplier. The third computer is responsive to the outputs of the first and second computers for producing an output which is the analog of the probability that the current observation unit contains the prescribed signal, conditioned on information obtained from all prior observation units. The outputs of the first and third computers are combined in the multiplier. The product output of the multiplier is operated on by the second likelihood computer which produces at the end of each observation unit an output that is the analog of the likelihood that the current observation unit contained the prescribed signal, conditioned on information obtained from prior observation units. If the magnitude of the output of the second computer exceeds a predetermined threshold level, the decision circuit produces an output indicating that the current observation unit of the input signal contains the prescribed signal.

This invention relates to adaptive pattern recognition systems and more particularly to pattern recognition systems which acquire information as "knowledge" of characteristics which identify patterns without external information on the proper classification of the patterns and without specific reference to classifications made by the system. The terms "knowledge," "learning" and the like are used in the following description of the invention because the pattern recognition system performs functions similar to those a human would perform in processing information to derive an answer or conclusion.

The general problem of pattern recognition is one of classification which may be stated as follows: given a sequence of objects, each of which is described by a set of measurements, classify the objects into classes which have similar characteristics. The classes may be separately identified as Class 1, Class 2, etc. Examples of such pattern recognition problems are deciphering a carelessly written address on a letter and identifying an artist by examination of his handiwork. In the case of the former, the name of the city may be obscured but the other elements of the address legible; the solution requires that information on cities within the particular state be compared with the discernible characteristics of the city name such as the number or positions of letters. In the example of art identification, idiosyncrasies of the artist such as length and pressure of brush strokes or the selection of colors are compared with similar characteristics in the work being analyzed and the probability that it is or is not the work of the artist is established.

In the area of electromagnetic communications, the pattern recognition problem may be posed by the requirements for determining the presence or absence of a prescribed signal which is obscured by noise. A prior type of adaptive pattern recognition system for solving this problem employs a set of input signals of known classification to extract additional information about the distinguishing features of the patterns. This adaptive system is said to learn "with a teacher" since the correct classification of the patterns must be known while the system learns the additional information. Another prior type of adaptive pattern recognition system does not require a "teacher" having prior knowledge of the classification of the input signals while the system is extracting additional information about the distinguishing features since this system always takes its own classification of the patterns as being correct. A decision generally causes the structure of the machine to change so that the decision is made more emphatically. The disadvantage of this system is that it compounds an error if the original determination is incorrect. Also, this system converges slowly to the correct determination of the presence and shape of the prescribed signal and is complex and unstable when solving multi-parameter decision problems.

An object of this invention is the provision of an adaptive pattern recognition system which is capable of learning to classify input signals without the aid of a "teacher" and without direct dependence on classifications made by the system. The system takes full advantage of information presently and previously available to the system to change the operation of the system so that classification becomes more reliable with time.

Another object is the provision of an adaptive pattern recognition system which "learns" to classify input signals without a "teacher" having prior knowledge of the proper classification of the input signals.

Another object is the provision of an adaptive pattern recognition system which learns to classify input signals independently of the classifications which are made by the system.

Another object is the provision of an adaptive pattern recognition system which classifies patterns with a minimum average risk of error associated with each classification.

Another object is the provision of an adaptive pattern recognition system which classifies patterns with greatest possible accuracy.

Another object is the provision of an adaptive pattern recognition system which takes advantage of all prior input signals in classifying a current input signal.

Another object is the provision of an adaptive pattern recognition system which is capable of accurate classification of a new input signal after receipt of minimum number of signals.

Another object is the provision of an adaptive pattern recognition system which acquires from each observation maximum additional knowledge of the features which distinguish the patterns.

In the most general form, the input of this system consists of one or more time varying signals (for example, the input may be in the form of electrical signals on appropriate input lines). The purpose of the system is to distinguish between various classes of inputs. It is assumed that initially the nature of some of the features distinguishing these input classes is known. A primary feature of a system embodying this invention is the extraction during each observation (without specific reference to the classifications of observations) of additional information which characterize signals of different classes. Thus, this invention is particularly useful in instances where prior knowledge of signal characteristics is not initially sufficient to permit accurate classification of signals.

After receiving a signal, a system embodying this invention scans through the range of all possible values of distinguishing characteristics, and computes for each set of values within this range the probability that a signal from Class 1, for example, would be the same as the received signal. For each set of signal characteristics, the above probability is multiplied by the probability that this set of characteristics is the true set for signals in Class 1. The sum of all such products is calculated. This sum is the probability that a signal from Class 1 would result in the observed signal. Similarly, the system computes the probability that the observed input signal would result from each of the other classes. The system classifies the input signal by comparing these probabilities. In arriving at a decision appropriate account is taken of the relative penalty associated with the different types of misclassifications and the relative frequency of occurrence of the different classes. This aspect of the invention is described in detail hereinafter.

Initially, the range of possible values of signal characteristics is known, but the probability associated with each set of signal characteristic values is merely postulated. By extracting the appropriate information from each observed signal, the system modifies the original (postulated) probability distribution for the characteristics such that the modified distribution more closely approaches the true distribution. The probability of misclassification becomes less as the assumed probability distribution of the characteristics approaches the true distribution (i.e., as the distinguishing characteristics become better known).

The foregoing and other objects and the operation of this invention will be more fully understood from the following description of embodiments thereof, reference being had to the accompanying drawings in which.

Figure 6C:
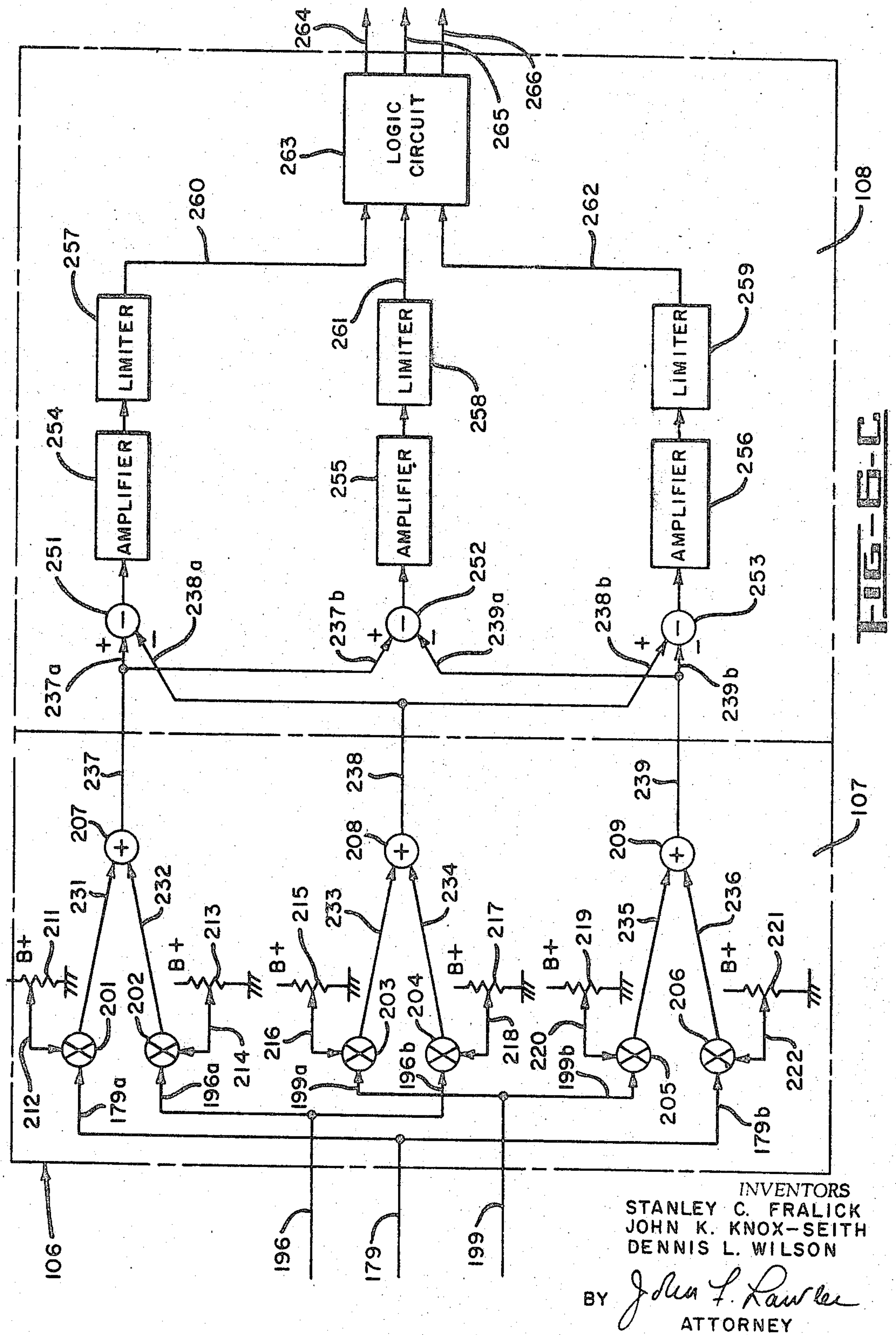
Figure 7:
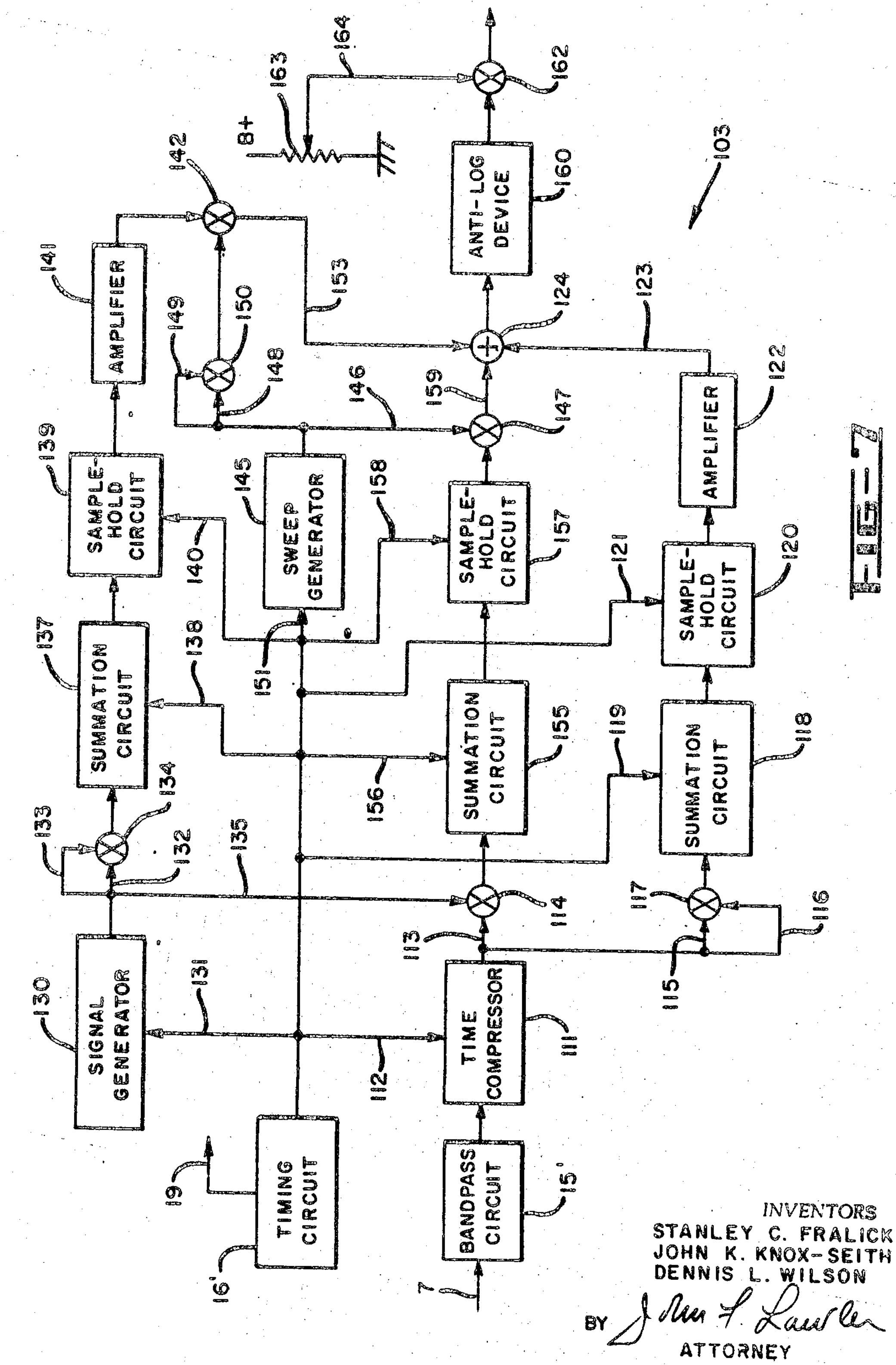
Figure 10:
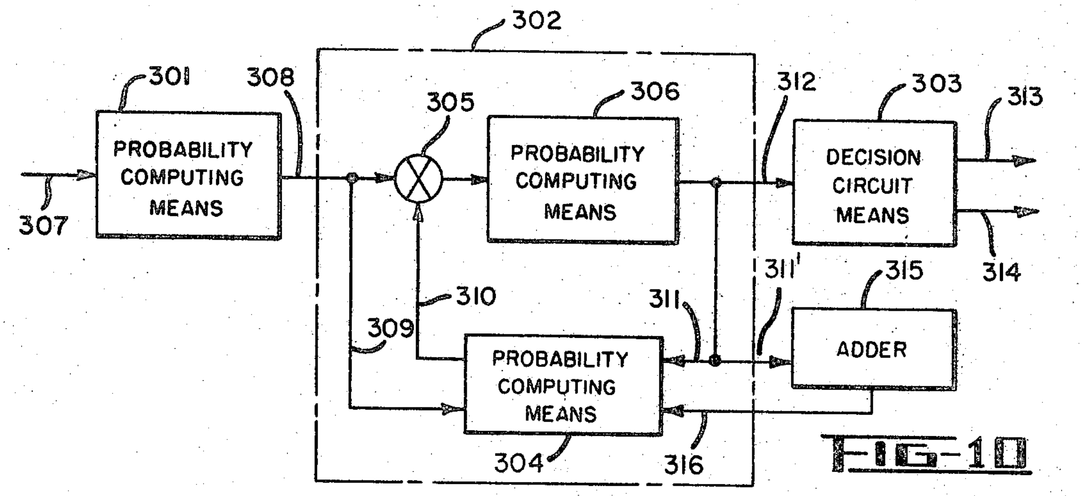
Figure 9:
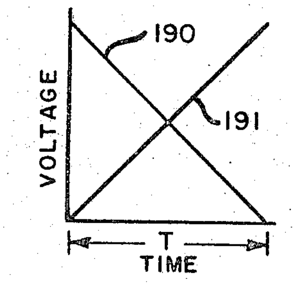

FIGURE 6 (illustrated in three parts as FIGURES 6A, 6B and 6C) is a block diagram of a multi-parameter multi-hypothesis adaptive pattern recognition system embodying this invention;

FIGURE 7 is detailed block diagram of probability computer 103 shown in FIGURE 6A;

FIGURES 8A–8C show timing diagrams illustrating the sweeping operation of probability computer 103 of FIGURE 6A;

FIGURE 9 shows typical outputs of function generators 192 and 193 of FIGURES 6A and 6B, respectively; and FIGURE 10 is a simplified block diagram of a multi-parameter multi-hypothesis adaptive pattern recognition system illustrating the invention in a broader form.

A simplified form of this invention illustrated in FIGURES 1–5 is first described to provide a basic understanding of the underlying principles and to explain terminology related to the invention. This embodiment comprises a system which solves a dual-hypothesis single-parameter signal detection problem. The system is used to detect a narrowband electromagnetic signal of unknown frequency imbedded in a noisy environment. A more complex system for solving a multi-hypothesis multi-parameter signal detection problem is illustrated in FIGURES 6–9, inclusive, and will be described thereafter. Finally, the invention is described in its broadest form in conjunction with FIGURE 10.

DUAL-HYPOTHESIS SINGLE-PARAMETER SYSTEM

Figure 1:
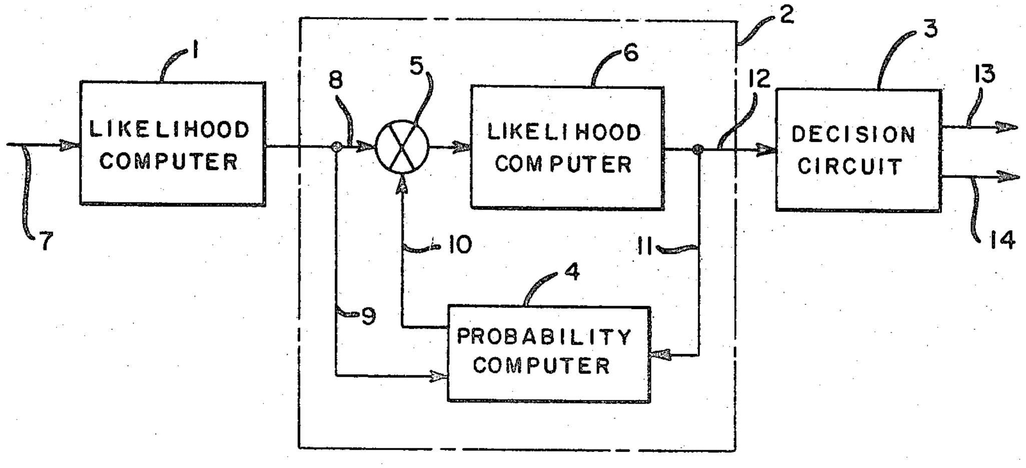
FIGURE 1 is a block diagram of a dual-hypothesis single-parameter adaptive pattern recognition system embodying this invention.
Figure 2:
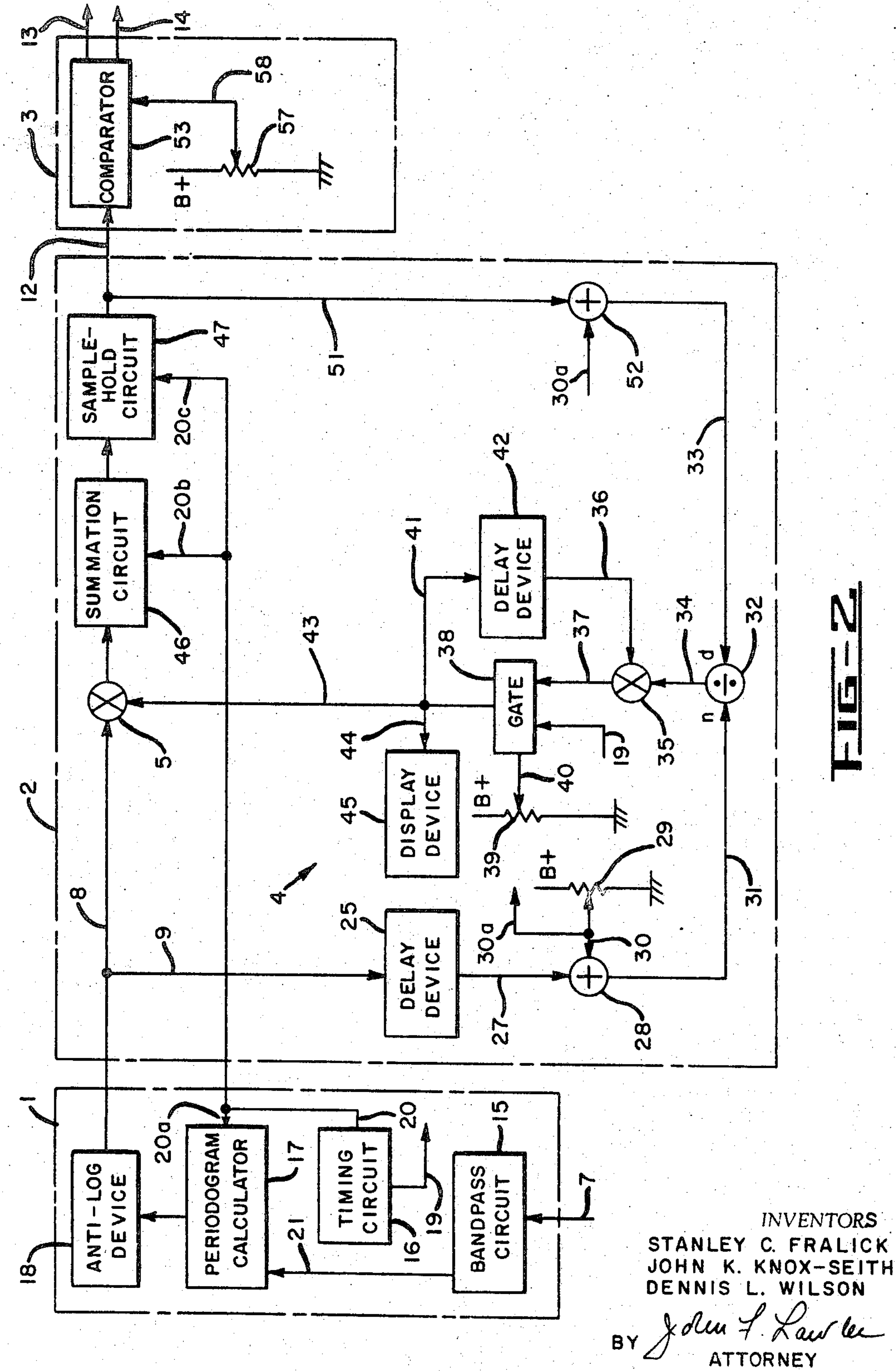
FIGURE 2 is a detailed block diagram of the embodiment of FIGURE 1.

FIGURES 1 and 2 illustrate a system for detecting the presence and frequency of a narrowband electromagnetic signal (which will be referred to as the "prescribed signal") of the form defined by $$s(t)=a\cos(\omega t+\theta) \qquad (1)$$

where $a$ is the amplitude, $\omega$ is the radian frequency and equals $2\pi f$, $f$ is frequency, $t$ is time, and $\theta$ is the phase. The input signal is assumed to contain either the prescribed signal imbedded in white noise, or the noise background with no signal. The signal parameters $a$ and $\theta$ are random variables. For example, assume the amplitude parameter $a$ is Rayleigh distributed (see "Random Signals and Noise," by W. Davenport and W. Root, McGraw-Hill Book Co., 1958), and the phase parameter $\theta$ is uniformly distributed over the interval 0 to $2\pi$, i.e., it is equally likely that $\theta$ has each value in the interval 0 to $2\pi$. Signal frequencies of interest are between a frequency $f=f_0$ c.p.s. and $f=f_0+W$ c.p.s. where W is the bandwidth of the system. By learning this frequency, the system improves its ability to distinguish between the presence and absence of the prescribed signal in an input signal. This system is particularly useful for detecting prescribed signals with magnitudes considerably less than the noise level.

Referring now to FIGURE 1, the adaptive pattern recognition system comprises a likelihood computer 1, a learning loop 2 and a decision circuit 3. Learning loop 2 comprises a probability computer 4, a multiplier 5 and a likelihood computer 6.

The input signal is applied on line 7 to likelihood computer 1. The output of likelihood computer 1 is applied on line 8 to a first input to multiplier 5 and on line 9 to a first input to probability computer 4. The output of the probability computer is applied on line 10 to a second input to multiplier 5. The output of multiplier 5 is applied to likelihood computer 6, the output of which is applied on line 11 to a second input to probability computer 4 and on line 12 to decision circuit 3 which generates an output on either line 13 or line 14.

Likelihood computer 1 stores and operates on the section of the input signal received during a time period T. At a particular instant the output of the likelihood computer 1 is the analog representation of the likelihood that the observed section of input signal contains a signal of the prescribed form having a particular frequency $f$. A sequence of such outputs, corresponding in ascending order to all frequencies between $f_0$ and $f_0+W$ c.p.s., is provided during each time duration T.

The likelihood ratio at the frequency $f$ is defined as the ratio of the probability that an input signal containing the prescribed signal having a frequency $f$ would be identical with the observed signal, to the probability that the input signal would be as observed if it contained only noise. On the average, the likelihood ratio will be largest at the frequency of the prescribed signal when that signal is present.

Probability computer 4 processes the output of likelihood computer 1 and the output of the likelihood computer 6. At a particular time, the output of probability computer 4 is the analog of the probability that the frequency $f$ is the frequency of the prescribed signal, conditioned on information obtained from all prior observations of the input signal. During a time interval T, there is produced a sequence of such outputs corresponding to all frequencies in the band $f_0$ to $f_0+W$ c.p.s.

Likelihood computer 6 processes the product output of multiplier 5 and generates at the end of each time interval T an analog of the likelihood that the appropriate section of the input signal contains the prescribed signal, conditioned on information about the input signal that is obtained from prior observations thereof. Decision circuit 3 compares the output of learning loop 2 with a predetermined threshold value $\beta$ and provides an output on either line 13 or line 14 indicating whether it is likely that the preceding section of the input signal does or does not, contain the prescribed signal.

The threshold value $\beta$ is independent of the observations of the input signal. $\beta$ is represented as $$\beta=\frac{L_2(1-p)}{L_1 p} \qquad (2)$$

where $L_1$ is the relative penalty associated with a false alarm, i.e., deciding that the prescribed signal is present when it is not present; $L_2$ is the relative penalty associated with a miss, i.e., deciding that the prescribed signal is not present when it is present; and $p$ is the a priori probability that the prescribed signal is present in the input signal.

An indication of the frequency of the prescribed signal is obtained by monitoring the output of probability computer 4.

Referring now to the embodiment of FIGURE 2, likelihood computer 1 comprises a bandpass circuit 15, a timing circuit 16, a periodogram calculator 17, and an anti-log device 18. Bandpass circuit 15 has frequency limits of $f_0$ c.p.s. and $f_0+W$ c.p.s. which define the band of frequencies W on which the system will operate. The bandpass circuit may, by way of example, be a passive filter.

Timing circuit 16 is activated when the system is initially energized. This circuit generates on line 19 at time $t_0$ an initiating pulse having a duration $T_0$ and a timing pulse on line 20 at time $t_0$ and every T seconds thereafter.

Figure 3:
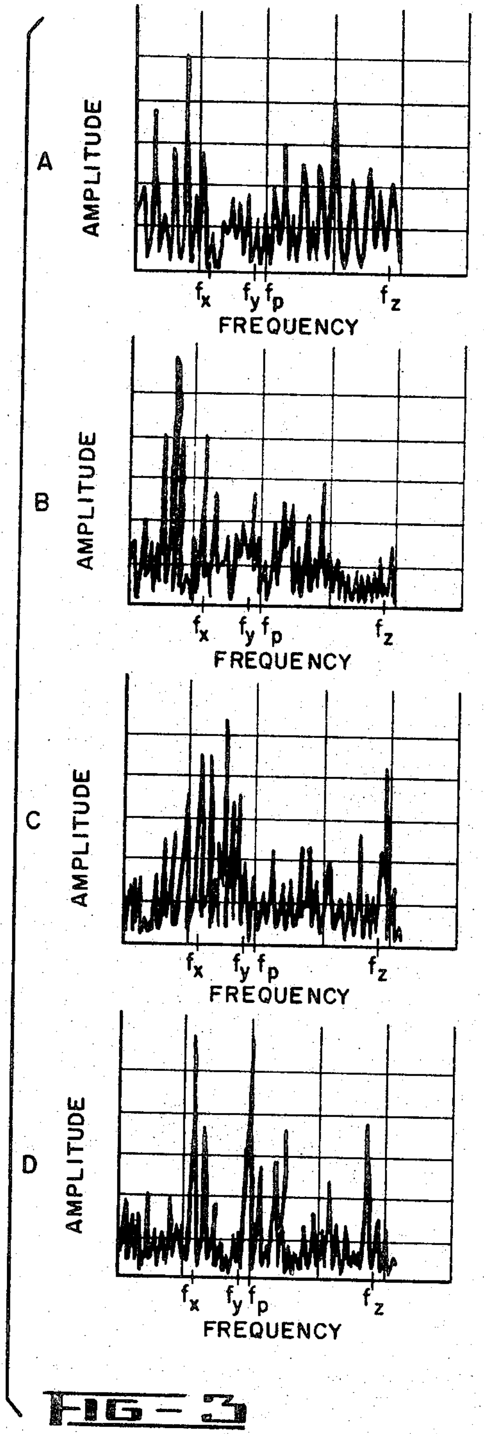
FIGURES 3A–3H show waveforms of typical outputs of a periodogram calculator which forms part of the system shown in FIGURE 2.

The filtered input signal is applied on line 21 to periodogram calculator 17 which computes an analog of the periodogram or spectral (frequency) density distribution of the input signal. Typical periodograms, plotted as a function of frequency, are shown in FIGURE 3 and show the relative energy density of the input signal over the frequency band W. Periodogram calculator 17 may, by way of example, be a time compression type swept receiver as described in "The Measurement of Frequency With Scanning Analyzers," by W. R. Kincheloe, Jr., Technical Report 557–2, dated October 1962, System Technology Laboratories, Stanford University, Stanford, Calif. The periodogram calculator 17 sweeps over all frequencies $f$ in the band W once every T seconds in response to a timing pulse from timing circuit 16 on line **20*a*. The output of periodogram calculator 17 is applied to anti-log device 18**.

Anti-log device 18 generates an output that is proportional to the natural anti-log of the output of periodogram calculator 17. By way of example, the construction of the anti-log device may be based on the logarithmic relationship between the voltage across a semiconductor junction and the current through the junction as described in "Large-Signal Behavior of Junction Transistors," by Ebers & Moll, IRE Proceedings, volume 42, December 1954.

The output of anti-log device 18 is applied on line 8 to the first input to multiplier 5 and on line 9 to delay device 25 of probability computer 4. The time delay of device 25 is equal to the sweep time T of periodogram calculator 17. Delay device 25 may, by way of example, be a delay line, shift register, or tape recorder.

The output of delay device 25 is applied on line 27 to a first input to an adder 28. A predetermined bias $\alpha_1$ is generated on lines 30 and **30*a* by a potentiometer 29. The bias on line 30 is applied to a second input to adder 28**. The constant $\alpha_1$ is the analog of the ratio of the a priori probability that the input signal does not contain the prescribed signal to the a priori probability that the input signal does contain the prescribed signal.

The sum signal from adder 28 is applied on line 31 to a first input to a divider 32. A second signal (to be described more fully hereinafter) is applied to a second input to divider 32 on line 33. The output of divider 32 is the analog of the signal on line 31 divided by the signal on line 33. Divider 32 may, by way of example, be of the type described by Kundu and Banerji in "Transistorized Multiplier and Divider," IEEE Transactions on Electronic Computers, volume EC–13, Number 3, June 1964.

The output of divider 32 is applied on line 34 to a first input to multiplier 35. A second signal (to be described more fully hereinafter) is applied to a second input to multiplier 35 on line 36.

The product output of multiplier 35 is applied on line 37 as a first input to gate 38. The initiating pulse from timing circuit 16 is applied to gate 38 on line 19. A predetermined bias $\alpha_2$ is generated by a potentiometer 39 and applied on line 40 as a third input to gate 38. The constant $\alpha_2$ is the analog of the initial or a priori probability density (determined before making any observations of time duration T) of the frequency of the prescribed signal. This a priori probability is the output of probability computer 4 (FIGURE 1) during the first observation and is represented by the waveform of FIGURE 4A. Since there is no prior knowledge of the probable frequency of the prescribed signal that may be present in the input signal, it is reasonable to make the initial distribution uniform and assign $\alpha_2$ a value of $1/W$, i.e., it is equally probable that the frequency of the prescribed signal is any frequency in the frequency band W.

The output of gate 38 is applied to a delay device 42 on line 41. Delay device 42 is similar to delay device 25 and also has a time delay equal to the sweep duration T of periodogram calculator 17. The signal stored by delay device 42 is the signal applied to multiplier 35 on line 36.

Figure 4:
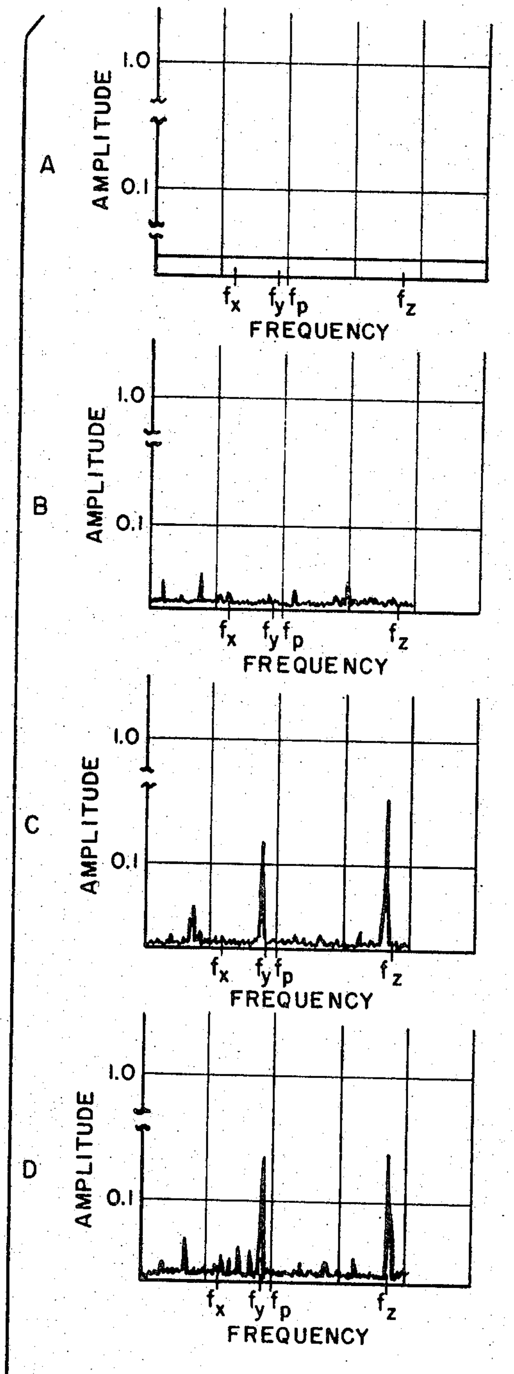
FIGURES 4A–4H illustrate waveforms of typical outputs of a probability computer forming part of the system shown in FIGURE 1.
Figure 3:
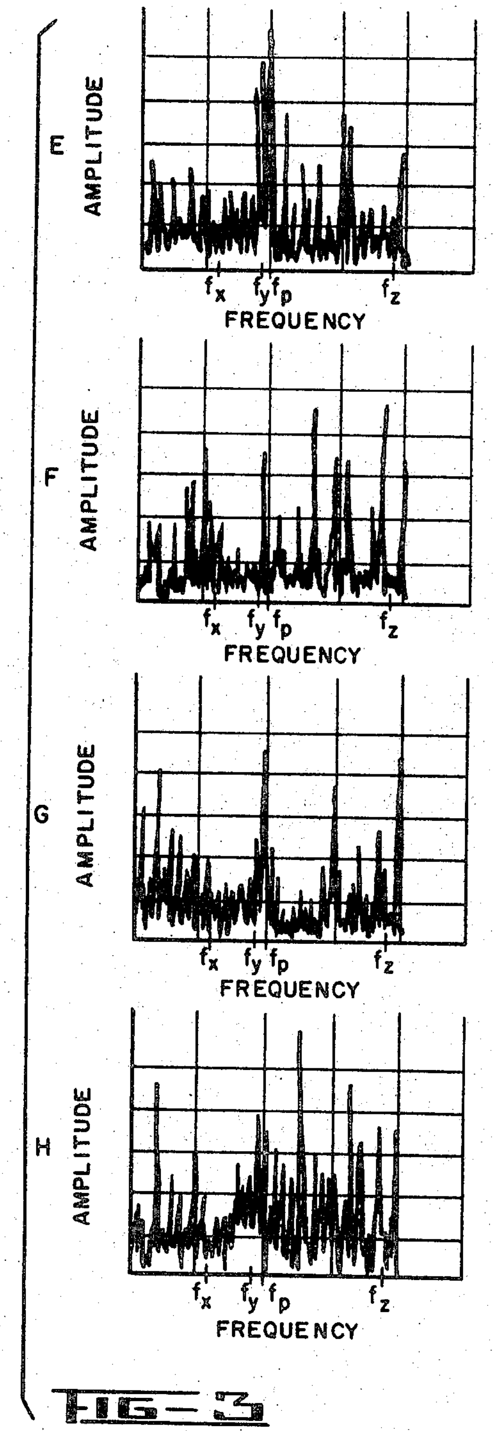
Figure 4:
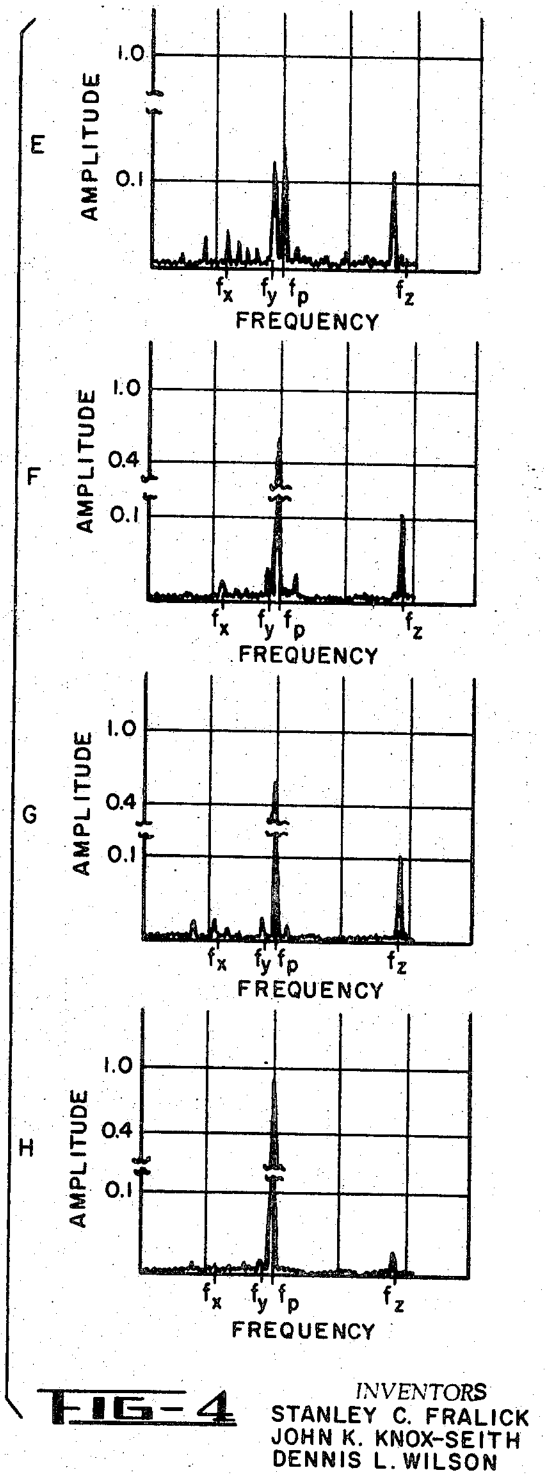

The output of gate 38 is also applied to multiplier 5 on line 43 and on line 44 to a display device 45. The display device may, by way of example, be an oscilloscope or strip chart recorder. The display device plots the signal output of gate 38. Typical product signal outputs or probability densities as a function of frequency are illustrated in FIGURE 4.

The product output of multiplier 5 is applied to summation circuit 46 of likelihood computer 6. Summation circuit 46 may, by way of example, be a fixed time integrator circuit. The output of circuit 46 is the summation of the input product signal generated during the present observation of time duration of T seconds. The summation circuit is reset to zero every T seconds in response to a timing pulse from timing circuit 16 on line **20*b***.

The output of summation circuit 46 is applied to sample-hold circuit 47. In response to a timing pulse on line **20*c*, circuit 47 samples the output of the summation circuit once every T seconds, immediately prior to the summation circuit reset. The sample-hold circuit 47 stores the sampled signal for a time duration T, until it again samples the output of summation circuit 46**.

The output of sample-hold circuit 47 is applied on line 51 to a first input to an adder 52. The predetermined bias $\alpha_1$ from potentiometer 29 is applied on line **30*a* to a second input to adder 52. The output of adder 52 is the aforementioned signal applied on line 33 to divider 32**.

The output of sample-hold circuit 47 is applied on line 12 to decision circuit 3. The decision circuit may, by way of example, be a comparator 53 comprising a threshold device such as a Schmitt trigger circuit. A predetermined bias or threshold $\beta$ is generated by a potentiometer 57 and is applied to the comparator on line 58. If the signal on line 12 is larger than $\beta$, an output is present on line 13 indicating that the prescribed signal probably is present in the input signal. Conversely, if the signal on line 12 is less than $\beta$, an output on line 14 is present indicating that the prescribed signal probably is not present in the input signal.

The operation of the system is illustrated in the following example which shows the response of the system to a particular input signal. A typical input signal is represented by the waveform 65 of FIGURE 5. The instantaneous amplitude of the input signal is plotted as a function of time. The time scale is divided into a number of time periods of time duration T, the time interval $t_0$ to $t_1$ corresponding to the first observation period $T_1$, etc. Each period of time duration T defines the time of one "observation" of the input signal. Assume that the prescribed signal is present in the input signal between times $t_5$ and $t_{20}$ as indicated by the dashed line 66. The prescribed signal is not present between times $t_0$ and $t_5$. The signal parameters $a$ and $\theta$ in Equation 1 are assumed to be represented by known distribution functions. In this example, the frequency of the prescribed signal is a particular frequency $f_p$ (see FIGURES 3 and 4); the operator of the system, however, only knows that the frequency is between $f_o$ and $f_o+W$ c.p.s. The input signal is assumed to contain White noise. The problem is to determine the presence and frequency of the prescribed signal.

Normally the line 37 is connected through gate 38 to lines 41, 43 and 44. When the system is initially actuated, timing circuit 16 produces pulses on lines 19 and 20. The initiating pulse on line 19 disconnects line 37 from the output of the gate and connects the bias $\alpha_2$ on line 40 to the output of gate 38 and thereby to delay device 42. The initiating pulse on line 19 is removed after the first observation of time duration T and gate 38 is returned to its normal condition.

The filtered input signal is continuously applied to periodogram calculator 17. The periodogram calculator operates on the filtered input signal as the calculator repeatedly sweeps linearly over the frequency band W. The filtered input signal is divided into a sequence of observations of time duration T by the operation of timing circuit 16. The timing pulses on line 20*a* synchronize and periodically (times $t_1$, $t_2$, $t_3$ . . ., see FIGURE 5) reset the calculator so that it sweeps over the frequency band W once during each observation of time duration T. Thus, the calculator output, which is generated as a function of time, is also a function of frequency, i.e., each time $t$ in the time interval T corresponds to a different frequency $f$ in the frequency band W, the frequency $f=f_o+W$ corresponding to the time $t=T$. The time duration T of the observation is varied by adjustment of timing circuit 16 in accordance with the desired resolution and the expected time duration of the prescribed signal. The periodogram calculator output during a time period T is an estimate of the frequency distribution of input signal energy during the current observation. The calculator computes a new set of periodograms during each observation of time duration T. Periodograms of the input signal, computed during subsequent observations $T_1$, $T_2$, $T_6$, $T_7$, $T_8$, $T_9$, $T_{10}$ and $T_{11}$ are illustrated in FIGURES 3A, B, C, D, E, F, G and H, respectively.

The periodograms of FIGURES 3A and 3B are generated during the first and second observations $T_1$ and $T_2$, respectively, when the signal input contains only noise. The periodogram of FIGURE 3C, however, is generated during the sixth observation $T_6$ when the input signal contains the prescribed signal and noise. The periodogram of FIGURE 3D is generated during the seventh observation $T_7$, after the prescribed signal having a particular frequency $f_p$ has been present for the one full observation $T_6$. The periodograms of FIGURES 3E, F, G and H are generated during the eighth, ninth, tenth and eleventh observations $T_8$, $T_9$, $T_{10}$ and $T_{11}$ after the prescribed signal has been present for two, three, four and five full observations, respectively. The calculation of a current periodogram, such as the periodogram $T_7$ which corresponds to the waveform of FIGURE 3D, is not a function of information obtained during the six prior observations. Reference to the waveforms of FIGURE 3 reveals the difficulty of determining when the prescribed signal is present in the input signal. Furthermore, each periodogram reveals little information about the frequency of the prescribed signal.

During the following discussion, consider that the present observation is the $k$th observation of a series and that the system has processed completely the preceding $k-1$ observations. In the example illustrated in FIGURES 3, 4 and 5, the prescribed signal is present during the sixth and subsequent observations.

The output of anti-log device 18 is delayed one time duration T by delay device 25. Thus, the output of the delay device 25 during the $k$th observation is the output of the anti-log device during the $k-1$th observation. The constant $\alpha_1$ is added to the delayed signal in adder 28.

The signal on line 31, which is an indication of the frequency distribution of signal energy, is normalized in divider 32 by dividing it by the output of sample-hold circuit 47 obtained at the end of the $k-1$th observation. The normalization insures that the summation of the probability on line 43 over each observation is unity. The output from sample-hold circuit 47 is a function of the information obtained during the prior $k-1$ observations. Thus, the output of divider 32 is a function of the information obtained from the prior $k-1$ observations. If this signal contains a peak at the same frequency during subsequent observations, this peak is reinforced in multiplier 35 (as described more fully hereinafter) where it is multiplied by the output of the delay device 42 which is the output of multiplier 35 generated during the prior ($k-1$th) observation. At a particular instant, the product signal output of multiplier 35 is the analog of the probability that the frequency of the prescribed signal is the frequency $f$, conditioned on the information obtained during the prior $k-1$ observations. During the $k$th observation, a sequence of such outputs is provided corresponding to all frequencies in the frequency band W. The frequencies may, by way of example, be presented in ascending order.

The product signal outputs or probabilities generated by multiplier 35 during the observations, $T_1$, $T_2$, $T_6$, $T_7$, $T_8$, $T_9$, $T_{10}$ and $T_{11}$ are represented by the waveforms of FIGURES 4A, B, C, D, E, F, G and H respectively. The probabilities represented by the waveforms of FIGURES 4E, F, G and H illustrate the reinforcement of the indication of the probable frequency of the prescribed signal when the prescribed signal is present in the input signal.

The waveform of FIGURE 4A is generated during the first observation $T_1$. As this waveform indicates the probability density of the frequency of the input signal during the $k-1$th or 0th observation, before any input signal has been observed, it represents the a priori probability generated by potentiometer 39 and applied on line 40 to gate 38. The waveform of FIGURE 4B is generated during the second observation $T_2$, but it depends on information obtained during the first observation $T_1$. The waveform of FIGURE 4C is plotted during the sixth observation $T_6$ and depends on information obtained during the previous five observations. Since the prescribed signal has not been present prior to the sixth observation, the output of multiplier 35 can contain no information regarding the frequency of the prescribed signal.

The waveform of FIGURE 4D is plotted during the seventh observation $T_7$ (the prescribed signal being present during the sixth observation $T_6$). Although this waveform indicates that a probable frequency of the prescribed signal is $f_p$, it indicates that the signal frequency is more probably the frequency $f_y$ or $f_z$. The waveforms of FIGURES 4E, F, G and H are plotted during subsequent observations $T_8$, $T_9$, $T_{10}$ and $T_{11}$. These waveforms indicate the frequency probability density conditioned on information obtained from all previous observations. These figures clearly indicate that the system extracts the information regarding the frequency of the prescribed signal, when the prescribed signal is present in the input signal and reinforces the indication that the frequency of the prescribed signal is $f_p$. For example, the output of multiplier 35 during observation $T_{11}$ (FIGURE 4H) indicates with virtual certainty that the prescribed signal has a frequency $f_p$.

The probability computed by probability computer 4 (the output of multiplier 35) during the *k*th observation $T_k$ is conditioned on the information learned during the prior $k-1$ observations. This probability converges to unity at the exact value of the signal frequency as *k* is made large.

At a particular instant, the output of anti-log device 18 on line 8 is an indication of the likelihood that a prescribed signal is present at the frequency *f* (FIGURE 3). This output is multiplied in multiplier 5 by the output of gate 38 (FIGURE 5) which at that instant is an indication of the probability that the signal frequency is *f*. The product output of multiplier 5 is summed over all frequencies in the frequency band W during the present observation by summation circuit 46. The summation signal at the end of the *k*th observation $T_k$ is the analog of the likelihood that the input signal during the *k*th observation $T_k$ contains the prescribed signal, conditioned on the information obtained from the prior $k-1$ observations.

The summation signal is sampled by sample-hold circuit 47 at the end of each observation and the output from sample-hold circuit 47 is held constant at the sample value for one observation of time duration T. The constant $\alpha_1$ on line 30*a* is added to the summation signal on line 51 in adder 52. The sum signal from added 52 is the previously mentioned second input applied to divided 32.

The output of sample-hold circuit 47 on line 12 is compared with the constant $\beta$ by comparator 53 of decision circuit 3. If the magnitude of the summation signal is greater than the threshold $\beta$, an output on line 13 indicates that the prescribed signal is probably present in the input signal. An indication of the frequency of the prescribed signal is obtained from plots of the outputs of gate 38 (FIGURE 4). If the magnitude of the summation signal is less than the threshold $\beta$, an output on line 14 indicates that the prescribed signal is probably not present in the input signal.

The learning process of learning loop 2 and the determination of the presence of the prescribed signal, will be more clearly understood from a qualitative discussion of the operation thereof. It will be noted, as described more fully hereinafter, that when the prescribed signal is present in the input signal peaks on line 34 (FIGURE 2) consistently occur at the frequency of the prescribed signal (see the frequency $f_p$, FIGURES 3D, E, F, G and H). The signal on line 34 is modified in multiplier 35 and delayed for one observation period by delay device 42 and applied on line 36 to multiplier 35. Thus, a peak at a specific frequency on line 34 during one observation shows up at the same frequency on line 36 during the next observation. The peaks that reoccur at the same frequency during successive observations are multiplied and thereby strongly reinforced in multiplier 35. The outputs of multiplier 35 are reduced at all other frequencies by this multiplication and the normalizing operation in divider 32. Eventually only a single peak is present at the frequency $f_p$.

Consider now a specific example wherein $k-1=7$ observations have been processed by the system and that the outputs of the various components during the seventh observation $T_7$ are as described below. The peaks of the output of periodogram calculator 17 (see FIGURE 3D) are accentuated by analog device 18. Thus, the output of likelihood computer 1 during the observation $T_7$ has several large peaks, one of these occurring at the frequency $f_p$ indicating the possible presence of the prescribed signal at this frequency. At the same time, the outputs of multiplier 35 and of gate 38 are relatively small for the frequency $f_p$ (see FIGURE 4D) since the system has not yet learned the frequency of the prescribed signal. The output of multiplier 5 is relatively small at all frequencies, since the probability on line 43 is not particularly large at any frequency. Consequently, the output of summation circuit 46 is small at the end of the seventh observation $T_7$ indicating that the prescribed signal probably was not present during the seventh observation $T_7$.

Consider now that the present observation is the eight observation $T_8$. The delayed signal on line 31 is proportional to the output of likelihood computer 1 generated during the prior observation $T_7$ (FIGURE 3D). The signal on line 34 is the delayed signal on line 31 that is normalized by the operation of divider 32. The signal applied on line 36 to multiplier 35 is the output of multiplier 35 and gate 38 during the observation $T_7$ (see FIGURE 4D). As the signals on lines 34 and 36 both have peaks at the frequency $f_p$ (see FIGURES 3D and 4D) during the present observation $T_8$, the output of multiplier 35 also has a peak at the frequency $f_p$ (see FIGURE 4E). It will be noted that the peak at the frequency $f_p$ during observation $T_8$ (see FIGURE 4E) is larger than the corresponding peak during the observation $T_7$ (see FIGURE 4D), indicating the reinforcement of the indication of the signal frequency when the prescribed signal is present in the signal input.

The operation of learning loop 2 during the observation $T_9$ is similar to the above. As both the input signals to multiplier 35 have peaks at the frequency $f_p$ (see FIGURES 3E and 4E); the output of the multiplier 35 has an even more pronounced peak at the frequency $f_p$ (see FIGURE 4F). It will be noted that this peak at the frequency $f_p$ (see FIGURE 4F) is much larger than the corresponding peak in the prior observation $T_8$ (see FIGURE 4E), whereas the peaks at other frequencies are less than the corresponding peaks during the prior observation. The further reinforcement, during subsequent observations, of the indication that the probable frequency of the prescribed signal is the frequency $f_p$ is illustrated in the waveforms of FIGURES 4G and 4H.

The probability computed by multiplier 35 on line 43 is multiplied in multiplier 5 by the output of likelihood computer 1 on line 8. As both signals are relatively large at the frequency $f_p$ during observations $T_7$, $T_8$, $T_9$, $T_{10}$ and $T_{11}$ (see FIGURES 3D–H and 4D–H), the product output of multiplier 5 is greatly increased at that frequency. The product output is summed over each observation by summation circuit 46 and is sampled and held constant at the end of the observation by sample-hold circuit 47. This summation signal indicates the likelihood that the prescribed signal is present in the signal input during the past observation.

This system may also be operated as a "sampled data system" by incorporating a sampling circuit (not shown) in line 21 between bandpass circuit 15 and periodogram calculator 17, and employing a clock circuit in place of timing circuit 16. The sampling circuit samples the filtered signal at the Nyquist rate of 2W samples per second (or faster) to convert the continuous time varying signal of FIGURE 5 to a finite number of signal samples. The clock generates a clock pulse on line 20 each time it receives 2TW signal samples. Signal samples which are generated at the Nyquist rate contain essentially the same information as the continuous time varying signal (see "Communications in the Presence of Noise," by Claude E. Shannon, Proceedings of the IRE, volume 37, 1949).

A sampled data system which has an equivalent frequency band W of one megacycle per second was operated and tested. The equivalent time duration T of each observation was 0.1 millisecond. $2TW=200$ signal samples were generated during each observation. The waveforms of FIGURES 3 and 4 illustrate the operation of the system when the signal-to-noise ratio associated with the signal input was $-17$ db. It was determined empirically for a system having $2TW=200$ signal samples generated during each observation, that 4, 15 and 99 consecutive observations containing the prescribed signal were required to accurately determine the signal frequency when the signal-to-noise ratio was −11 db, −17 db and −23 db, respectively.

MULTI-HYPOTHESIS MULTI-PARAMETER SYSTEM

A system which distinguishes between two classes of input signals is described above. It was assumed that the signals defining the two classes of inputs were completely described except for one unknown parameter (frequency). The principle which underlies that system can be extended, as described hereinafter, to systems which must distinguish between a plurality of different classes of input signals, which are fully described except for a number of unknown parameters. Consider a system which must distinguish between the following classes of input signals:

(1) A signal which contains only noise;

(2) A signal which contains noise plus a first prescribed signal represented as $$s_1(t)=a_1 \cos(\omega_1 t+\theta_1) \qquad (3)$$

where $a_1$, $\omega_1$ and $\theta_1$ are unknown parameters which fall within given ranges; and (3) A signal which contains noise plus a second prescribed signal represented as $$s_2(t)=a_2 \cos(\omega_2 t+\theta_2) \qquad (4)$$

where $a_2$, $\omega_2$ and $\theta_2$ are unknown parameters different from $a_1$, $\omega_1$ and $\theta_1$.

Although the parameters $a$, $\omega$, and $\theta$ may take on any value within the given ranges, it is sufficient to consider a fixed number of discrete values of these parameters spaced evenly over each range. Thus, if the frequency is known to lie between one and two kc., it may be sufficient to consider that the frequency is one of the following values: 1.00 kc., 1.01 kc., 1.02 kc., 1.03 kc. . . . 1.99 kc. and 2.00 kc. Thus, it will, in general, be possible to think of each parameter as having a finite number of possible values. During the learning process it is necessary to consider all possible combinations of parameter values.

A multi-hypothesis multi-parameter signal detection system is illustrated in schematic form in FIGURE 6. The system comprises a bandpass circuit 15′ and timing circuit 16′; a probability computer 101 and multiplier 102; a probability computer 103 and associated learning loops 104 (FIGURE 6A) and 105 (FIGURE 6B) and a decision circuit 106 (FIGURE 6C) comprising a risk calculator 107 and a comparator circuit 108. Bandpass circuit 15′ and timing circuit 16′ are similar to those devices disclosed in the embodiment of FIGURE 2. Probability computer 103 is illustrated in block form in FIGURE 7.

At a particular instant, probablity computer 103 computes the probability that a prescribed signal having a specific set of parameter values would produce an input signal as observed during the previous time duration T.

Figure 8:
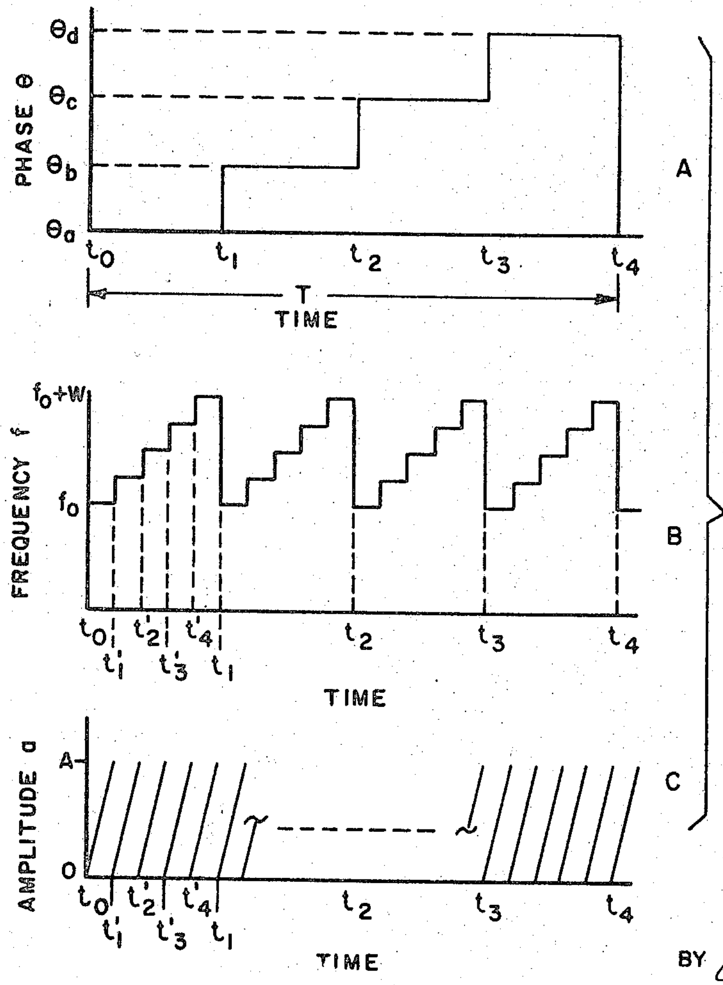

Probability computer 103 scans all possible combinations of values of the parameters $a$, $\omega$, and $\theta$ during each observation period T. This is accomplished, as illustrated in FIGURE 8, by dividing the time period T into a number of subintervals corresponding to the number of different values of one of the parameters.

For example, consider that the phase parameter $\theta$ can take on only one of four values between $\theta_a$ and $\theta_d$ (see FIGURE 8A), and that the time duration T, is divided into four subintervals $t_0$–$t_1$, $t_1$–$t_2$, $t_2$–$t_3$, and $t_3$–$t_4$. Consider also that the frequency parameter $f$ can take on only one of five discrete values between $f_o$ and $f_o+W$; therefore each of the four subintervals (FIGURE 8A) are further divided into five smaller or incremental time intervals $t_0$–$t_1'$, $t_1'$–$t_2'$, etc. as illustrated FIGURE 8B. Consider further that the amplitude parameter $a$ may take on any value between zero and A. Then, during time $t_0$–$t_1$ (FIGURE 8B) probability computer 103 scans all possible values of the amplitude parameter a (FIGURE 8C), while the frequency parameter $f$ (FIGURE 8B) and the phase parameter $\theta$ (FIGURE 8A) are kept fixed, respectively, at $f_o$ and $\theta_a$. As indicated in FIGURE 8, probability computer 103 scans during time $t_0$–$t_1$ all possible combinations of the amplitude and frequency parameters while the phase parameter $\theta$ is held fixed at $\theta_a$. Thus, during time $T=t_0-t_4$ probability computer 103 scans all possible combinations of the amplitude, frequency and phase parameters.

Referring now to the embodiment of FIGURE 7, timing circuit 16′ generates a timing pulse at times $t_0$, $t_1'$, $t_2'$, etc. (FIGURES 8B and C). The input signal is filtered by bandpass circuit 15′ and is applied to "time compressor" 111. A time compressor is a device which stores a signal received during a time period, and provides a readout during a shorter time interval. In this embodiment, a nondestructive readout is provided so that the same signal may be read out during successive intervals.

Time compressor 111 "compresses" the input signal receive during the $k-1$th observation into the smallest incremental time interval, such as $t_0$–$t_1'$ of FIGURE 8B. During the $k$th observation, the input signal stored in the compressor is read out on lines 113, 115 and 116 during each of the successive time intervals $t_0$–$t_1'$, $t_1'$–$t_2'$, etc. in response to a timing pulse on line 112. Time compressor 111 may, by way of example, be the type marketed by Computer Control Company, Inc. and described in that company's Engineering Application Note 3C 005–3.

The compressed signal is applied on line 113 to a first input to multiplier 114 and on lines 115 and 116 to inputs to multiplier 117. The output of multiplier 117, which is the square of the compressed signal, is summed by summation circuit 118 and sampled and held constant for one incremental time interval by sample-hold circuit 120. The operation of circuits 118 and 120 is controlled by timing pulses on lines 119 and 121, respectively.

The output of sample-hold circuit 120 is applied to an amplifier 122 for inverting the signal and for controlling the magnitude of the signal on line 123 relative to the other input signals to adder 124.

During a particular incremental time interval such as $t_0$–$t_1'$, a function generator 130 generates an output of the same form as the prescribed signal (see Equations 3 and 4) with the parameters $\theta$ and $f$ having the values corresponding to those shown for the sub-intervals (in FIGURES 8A and 8B). The generation of these waveforms is initiated by timing pulses from timing circuit 16′ on line 131. Function generator 130 may, by way of example, consist of a tape recorder (or other suitable circulating storage device), four phase-shift circuits and a synchronized commutator. Sinusoidal signals having frequencies $f_1$, $f_2$, $f_3$, $f_4$ and $f_5$, respectively, are prerecorded on separate tracks of the tape recorder and played back, properly synchronized, through the phase-shift circuits. The commutator selects the proper frequency and phase. The output of function generator 130 is applied on lines 132 and 133 to inputs of a multiplier 134 and on line 135 to a second input to the multiplier 114. The product output of multiplier 134, which is the square of the output of function generator 130 is applied to a summation circuit 137 which sums the product signal during each incremental time interval $t_0$–$t_1'$ etc. in response to a timing pulse on line 138. The summation signal is sampled and held constant for one incremental time interval by sample-hold circuit 139 in response to a timing pulse on line 140. The sampled signal is applied to an amplifier 141 similar to amplifier 122. The amplified signal is applied to a first input to multiplier 142.

During each incremental time interval, a sweep generator 145 produces an output which sweeps over the range of the amplitude parameter $a$. Sweep generator 145 is initiated and synchronized by a timing pulse from timing circuit 16′ on line 151. The output of sweep generator 145 is applied on line 146 to a multiplier 147, and on lines 148 and 149 to a multiplier 150. The output of multiplier 150, which is the square of the output of sweep generator 145, is applied to the second input to multiplier 142. The output of multiplier 142 is applied on line 153 to the second input to the adder 124.

The product output of multiplier 114 is summed during each incremental time interval by summation circuit 155 in response to a timing pulse on line 156. The summation signal is sampled and held constant for one incremental time interval (e.g., $t_0$-$t_1'$) by sample-hold circuit 157 in response to a timing pulse on line 158. The sampled signal is applied to the second input to multiplier 147. The output of multiplier 147 is applied on line 159 as the third input to adder 124.

The sum signal from adder 124 is applied to anti-log device 160. The output of device 160 is applied as a first input to multiplier 162. A potentiometer 163 generates a predetermined bias which is the analog of $$\frac{1}{(2\pi)^{TW}T^{1/2}\sigma)} \quad (5)$$

where T is the time duration of one observation, W is the frequency bandwidth, and $\sigma$ is the RMS noise amplitude. This bias is applied on line 164 to the second input of multiplier 162. The output of multiplier 162 is the output of probability computer 103 (see FIGURE 6A).

Referring now to FIGURE 6A, the output of probability computer 103 is applied on lines 109 and 110 to learning loops 104 and 105 (FIGURE 6B), respectively. The learning loops 104 and 105 are similar in structure and operation to the learning loop 2 which is illustrated in FIGURE 2. Since learning loops 104 and 105 are similar in structure and operation to each other and to learning loop 2 shown in FIGURE 2, it will be sufficient for an understanding of loops 104 and 105 to describe only one of them, i.e., loop 104, in respect to the differences between it and loop 102; like reference characters indicating like parts on the drawings.

The signal on line 9 is applied to a first input to multiplier 171. A predetermined bias which is the analog of the a priori probability $P_0(H_2)$ that the observed signal input contains the first prescribed signal is generated by potentiometer 172 and applied on line 173 to the second input to multiplier 171. The output of multiplier 171 is applied to delay device 25. The delayed signal is applied to a first input to adder 175.

The output of sample-hold circuit 47 on line 177 is applied to the first input of multiplier 178. The predetermined bias potential $P_0(H_2)$ is applied on line 173a to the second input to multiplier 178. The output of multiplier 178 is applied on line 179 to risk calculator 107 (FIGURE 6C), on line 180 to a first input to an adder 181, and on line 182 to a difference circuit 183. The difference circuit may, by way of example, be a difference amplifier. Second and third inputs are applied on lines 195 and 200 to adder 181.

Theh output of adder 181 is applied on line 185 to the second input to difference circuit 183 which subtracts the signal on line 182 from the signal on line 185. The difference signal is applied on line 186 to the second input to adder 175.

The output of adder 181 is also applied on line 33 to divider 32. The output of adder 175 is applied on line 31 to divider 32 which divides that signal by the signal on line 33. The circuits connected between the divider 32 and multiplier 5 are similar to the corresponding circuits of FIGURE 2, except for function generators 192 and 193 (FIGURE 6B) which are used to generate the initial probability distribution for the parameters $a$, $f$, and $\theta$, as will be described more fully hereinafter.

Learning loop 105 is similar in structure to the learning loop 104 except that the former does not contain a circuit corresponding to adder 181. Adder 181 of learning loop 104 provides the necessary outputs for all other learning loops. The output of adder 181 is applied on line 185' to difference circuit 183 of FIGURE 6B.

The predetermined bias generated by the potentiometer 172' of learning loop 105 and applied on line 173 to multiplier 171 and on line 173a to multiplier 178 is the analog of the priori probability $P_0(H_3)$ that the observed signal input contains the second prescribed signal.

The initial bias applied to gate 38 (see FIGURE 2) of learning loop 2 is a constant since it is equally likely that the frequency of the prescribed signal is any frequency $f$ in the frequency band W. It is possible to insure that the learning loops 104 and 105 do learn the parameters corresponding to the two different prescribed signals by making the initial bias signals (which are applied to gates 38 in learning loops 104 (FIGURE 6A) and 105 (FIGURE 6B)) different bias functions such as represented by the waveforms 190 and 191 of FIGURE 9 (rather than constants). More particularly, the waveform 190 (FIGURE 9), which is the analog of the a priori probability $P_0(H_2)$ that the first signal is present, is generated by the waveform generator 192 (FIGURE 6A) and is applied to gate 38. Similarly, the waveform 191, which is the analog of the priori probability $P_0(H_3)$ that the second signal is present, is generated by a function generator 193 (FIGURE 6B) and applied to gate 38.

The output of learning loop 105 (FIGURE 6B) on line 194 is applied on line 195 to adder 181 (FIGURE 6A) and on line 196 to risk calculator 107 (FIGURE 6C).

Probability computer 101 computes the probability that an input signal consisting of noise alone would be as observed. This probability clearly does not depend on any of the parameters $a$, $f$, or $\theta$. It is calculated by taking the analog of the integral of the square of the filtered input signal, where the integral is taken over the time duration of one observation.

The output of probability computer 101 is applied to multiplier 102. A predetermined bias that is the analog of the a priori probability $P_0(H_1)$ that the observed input signal contains only noise is generated by a potentiometer 197 and applied on line 198 to multiplier 102. The output of multiplier 102 is applied on line 199 to risk calculator 107 (FIGURE 6C) and on line 200 to the third input to adder 181 of learning loop 104.

Risk calculator 107 (FIGURE 6C) comprises multipliers 201 through 206, inclusive, and summation circuits 207, 208 and 209. The signal on line 199 is applied on line 199a to a first input to multiplier 203 and on line 199b to a first input to multiplier 205. The output of learning loop 104 on line 179 is applied on line 179a to a first input to multiplier 201 and on line 179b to a first input to multiplier 206. The output of learning loop 105 on line 196 is applied on line 196a to a first input to multiplier 202 and on line 196b to a first input to multiplier 204.

A predetermined bias which is generated by potentiometer 211 is applied on line 212 to a second input to multiplier 201. Similarily, a predetermined bias generated by potentiometer 213 is applied on line 214 to the second input of multiplier 202. The predetermined bias generated by potentiometer 211 is the assigned "loss" associated with making a particular decision that the observed input signal contains only noise, when the observed input signal actually contains the first prescribed signal. The predetermined bias generated by potentiometer 213 is the loss associated with making the decision that the observed input signal contains only noise, when the observed input signal actually contains the second prescribed signal.

A predetermined bias generated by potentiometer 215 is applied on line 216 to a second input to multiplier 203. Similarly, a predetermined bias generated by a potentiometer 217 is applied on line 218 to the second input of multiplier 204. The predetermined bias generated by potentiometer 215 is the assigned loss associated with making the particular decision that the observed input signal contains the first prescribed signal, when the observed input signal actually contains only noise. The predetermined bias generated by potentiometer 217 is the "loss" associated with making the decision that the observed input signal contains the first prescribed signal when the observed input signal actually contains the second prescribed signal.

A predetermined bias generated by potentiometer 219 is applied on line 220 to a second input to multiplier 205. Similarly, a predetermined bias generated by potentiometer 221 is applied on line 222 to the second input of multiplier 206. The predetermined bias generated by potentiometer 219 is the assigned "loss" associated with making a particular decision that the observed input signal contains the second prescribed signal when the observed input signal actually contains only noise. The predetermined bias generated by potentiometer 221 is the "loss" associated with making the decision that the observed input signal contains the second prescribed signal when the observed input signal actually contains the first prescribed signal.

The product signals from multipliers 201 and 202 are applied on lines 231 and 232, respectively, to summation circuit 207; the outputs of multipliers 203 and 204 are applied on lines 233 and 234, respectively, to summation circuit 208; and the outputs of multipliers 205 and 206 on lines 235 and 236, respectively, are applied to summation circuit 209.

The outputs of summation circuits 207, 208 and 209 are applied on lines 237, 238 and 239, respectively, to comparator circuit 108.

Comparator circuit 108 comprises difference circuits 251, 252 and 253; amplifiers 254, 255 and 256; limiters 257, 258 and 259; and logic circuit 263. These parts of the comparator circuit are connected in three channels which provide inputs to the logic circuit, each channel comprising a difference circuit, an amplifier and a limiter connected in series. The signal on line 237 is applied on line **237*a* to a first input to difference circuit 251 and on line 237*b* to a first input to difference circuit 252. Similarly, the signal on line 238 is applied on line 238*a* to a second input to difference circuit 251 and on line 238*b* to a first input to difference circuit 253. The signal on line 239 is applied on line 239*a* to the second input to difference circuit 252 and on line 239*b* to the second input to difference circuit 253**. The difference circuit may, by way of example, be a difference amplifier.

The difference signal from each difference circuit is amplified in an associated high gain amplifier such as amplifier 254. The amplified difference signal is clipped or limited to a constant value by an associated limiter circuit such as limiter 257. The limited difference signals on lines 260, 261, and 262, respectively, are applied to logic circuit 263 which indicates which of the hypotheses $H_1$, $H_2$ or $H_3$ is most probably true as described hereinafter.

Figure 5:
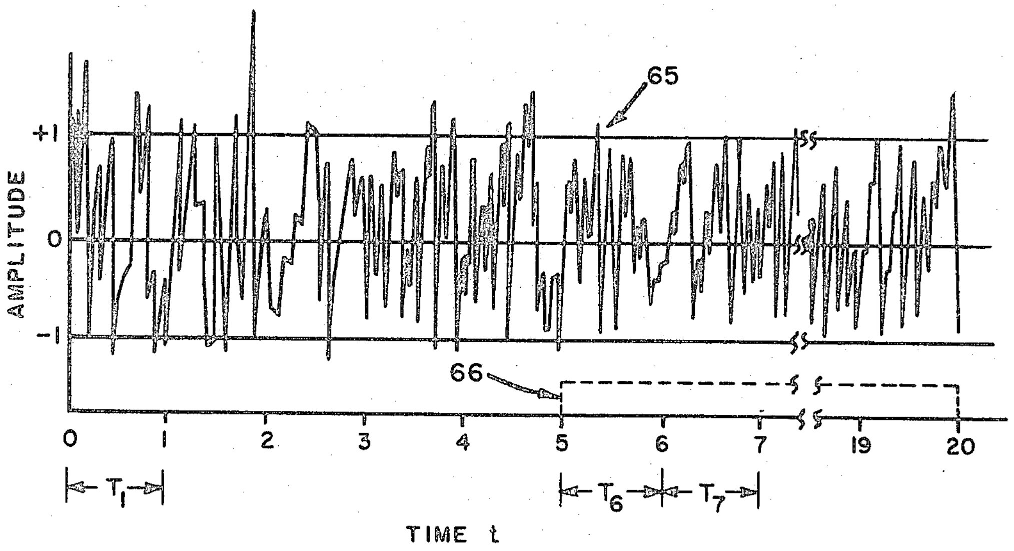
FIGURE 5 is a waveform representing an input signal.

Consider that an input signal such as represented by the waveform 65 of FIGURE 5 is applied on line 7 of FIGURE 6A. The input signal is filtered and applied to probability computers 101 and 103. The outputs of the probability computer 103 during different observations are similar to the waveforms of FIGURE 3 except that the output will be a function of the three signal parameters $a$, $\theta$ and $\omega$ rather than of the one signal parameter $\omega$.

Learning loops 104 and 105 operate on the output of probability computer 103 in a similar manner as described for the embodiment illustrated in FIGURE 2. By giving two different a priori distributions to the parameter sets (as shown in FIGURE 9), it is possible to insure that learning loop 104 will learn the parameter set associated with one of the prescribed signals and learning loop 105 will learn the parameter set associated with the other prescribed signal.

Risk calculator 107 (FIGURE 6C) operates on the outputs of learning loops 104 and 105 and probability computer 101 to compute three outputs on lines 237, 238 and 239 which represent the analogs of the risk associated with making a particular decision. The product signal on line 231 is the product of the loss associated with making a decision that the input signal contains only noise when the input signal actually contains the first prescribed input signal, multiplied by the probability that the input contains the first prescribed signal. The product signal on line 232 is the product of the loss associated with making the decision that the input signal contains only noise when the input signal actually contains the second prescribed signal, multiplied by the probability that the input contains the second prescribed signal. Thus, the summation signal on line 237 is the total risk associated with making the decision that the input signal contains only noise. Similarly on lines 238 and 239 represent the total risk associated with making the decision that the first prescribed signal is present in the input signal and that the second prescribed signal is present in the input signal, respectively.

Comparator 108 determines which of the three risks is the smallest. The difference circuits of comparator 108 generate differences between pairs of the risks on lines 237, 238 and 239. For example, the output of difference circuit 251 is the difference between the risk associated with making the decision that the input signal contains only noise (i.e., that hypothesis $H_1$ is true) and the risk associated with making the decision that the input signal contains the first prescribed signal (i.e., that hypothesis $H_2$ is true). If the signal on line **237*a* is more positive than the signal on line 238*a*, indicating that the risk associated with deciding that the hypothesis $H_1$ is true is greater than the risk associated with deciding that hypothesis $H_2$ is true, the output of difference amplifier 251 is positive. Conversely, if the signal on line 238*a* is more positive than the signal on line 237*a* indicating that the risk associated with deciding that the hypothesis $H_2$ is true is greater than the risk associated with deciding that the hypohesis $H_1$ is true, the output of difference amplifier 251 is negative. Similarly, the sign of the outputs of difference circuits 252 and 253** indicate the relative magnitudes of the risks associated with hypotheses $H_1$ and $H_3$, and $H_2$ and $H_3$, respectively.

The output signals from the limiter on lines 260, 261 and 262 are applied to logic circuit 263. Logic circuit 263 compares these input signals and decides which of the hypotheses $H_1$, $H_2$ or $H_3$ is most probably true by determining which of the hypotheses has the smaller associated risk. The comparison function performed by logic circuit 263 is tabulated in Table I.

TABLE I

| Input from difference amplifier | | | True hypothesis |
|---|---|---|---|
| 251 | 252 | 253 | |
| + | + | + | $H_1$ |
| + | + | − | $H_1$ |
| − | − | + | $H_2$ |
| − | + | + | $H_2$ |
| + | − | − | $H_3$ |
| − | − | − | $H_3$ |

GENERAL THEORETICAL DESCRIPTION

A more general form of this invention is described in conjunction with the schematic representation of the invention illustrated in FIGURE 10. The embodiment of FIGURE 10 is similar to that of FIGURE 1 and comprises probability computing means 301, 304 and 306, multiplier means 305, and adder 315 and decision circuit 303. Each of the means 301, 302, 303, 304, 305 and 306 may comprise a plurality of elements, e.g., multiplier means 305 may comprise a plurality of multipliers. The components of FIGURE 10 are interconnected in the same manner as are the components of FIGURE 1 except that the output of probability computing means 306 is also applied on line 311' to adder 315. The output of adder 315 is applied on line 316 to a second input to probability computing means 304.

A glossary of symbols employed hereinafter is included at the end of the specification.

Consider a general pattern recognition problem in which it is desired to determine which one of a set of $m$ prescribed signals gave rise to the observed input signal; i.e., it is desired to classify the observed input signal as belonging to one of the $m$ classes. Each class, or prescribed signal, is defined except for a set of unknown parameters having values within given ranges. In order to formulate the problem in decision theoretic terms, define a set of $m$ hypotheses as:

$H_l$ = the hypothesis that the input pattern belongs to class $l$

.
.
.

$H_i$ = the hypothesis that the input pattern belongs to class $i$

.
.
.

$H_m$ = the hypothesis that the input pattern belongs to class $m$

Let the unknown parameter set associated with the $i$th class be designated $A_i$. For example in the embodiment of FIGURE 6, the unknown parameter sets $A_2$ and $A_3$ consist of the amplitude parameter $a$, the frequency parameter $\omega$ and the phase parameter $\theta$. There were no unknown parameters for $H_1$. Thus, the parameter set $A_1$ may be represented by the vector $(a_1, \omega_1, \theta_1)$.

Without diminishing the general nature of these considerations, an observation of finite time duration and bandwidth may always be represented as a column vector X with a finite number of rows. T typical column vector associated with a sampled data form of the embodiment of FIGURE 6 is $$X=\begin{bmatrix} x(0) \\ \cdot \\ \cdot \\ x(\Delta) \\ \cdot \\ x(n\Delta) \end{bmatrix} \quad (6)$$

where $\Delta$ is the sampling interval and $x(n\Delta)$ is the sample value of the time varying input signal at time $n$ times the sampling interval $\Delta$. The object of this invention in these terms is the provision of means for operating on the input vectors X to decide for each vector which hypothesis $H_i$ is true. More particularly, the system computes, for each $i$ the probability $p(X_k|H_i,O_{k-1})$ that a signal from the class $i$ would produce the observed vector $X_k$, conditioned on the information obtained from prior observations. This information is used to decide which hypothesis $H_i$ is most probably true.

In order to understand the computations required of this system, consider first the case in which the unknown parameter set $A_i$ is known to have the values $\alpha_i$ (i.e., no learning is required). In this case the optimum system would compute $$p(X_k|H_i)=p(X_k|H_i,\alpha_i) \quad (7)$$

for each class $i$ (N. Abramson and J. Farison, "Applied Decision Theory," Report SEL-67-095 (TR2005-2), Stanford Elect. Labs., Stanford, Calif., September 1962). Equation 7 is the probability that a signal from class $i$ would produce the observed vector $X_k$ when the parameter set $A_i$ associated with class $i$ has the value $\alpha_i$.

If the value $\alpha_i$ of parameter set $A_i$ is not known, but a probability distribution of the value $\alpha_i$ is known, then $p(X_k|H_i)$ is the expected value of the right hand side of Equation 7 as follows:

$$p(X_k|H_i)=E_{\alpha_i}[p(X_k|H_i, \alpha_i)] = \int_{\alpha_i} p(X_k|H_i, \alpha_i)p(\alpha_i)d(\alpha_i) \quad (8)$$

In general, the desired classification can be achieved with greater accuracy if the uncertainty regarding the unknown parameters is reduced such as by modifying the distribution $p(\alpha_i)$ of Equation 8 in accordance with the previous observations $X_1, X_2, \ldots X_{k-1}$, as expressed in the equation $$p(\alpha_i|X_1 \ldots X_{k-1})=p(\alpha_i|O_{k-1}) \quad (9)$$

Employing in Equation 8 the most recent modified distribution as given by Equation 9, the probability that a signal from class $i$ would produce the observed vector $X_k$, conditioned on information obtained from the prior $k-1$ observations, is obtained. This probability may be represented as $$p(X_k|H_i, O_{k-1})=E_{\alpha_i}[p(X_k|H_i, \alpha_i, O_{k-1})] = \int_{\alpha_i} p(X_k|H_i, \alpha_i)p(\alpha_i|O_{k-1})d(\alpha_i) \quad (10)$$

This is the probability computed by the system.

To understand the computation of $p(\alpha_i|O_{k-1})$, consider the expression by use of Bayes Law)

$$p(\alpha_i|O_{k-1})=\frac{p(X_{k-1}|\alpha_i,O_{k-2})p(\alpha_i|O_{k-2})}{p(X_{k-1}|O_{k-2})} \quad (11)$$

$$=p(\alpha_i|O_{k-2})\frac{p(X_{k-1}|\alpha_i,O_{k-2})}{p(X_{k-1}|O_{k-2})} \quad (12)$$

where $O_{k-2}=X_1, X_2, \ldots X_{k-2}$.

Assuming that the a priori probability $(p(H_i))$ that an observed signal came from class $i$ is known for all $i$, then $$p(X_{k-1}|\alpha_i, O_{k-2})=\sum_j p(X_{k-1}|\alpha_i, H_j, O_{k-2})p(H_j) \quad (13)$$

$$=p(X_{k-1}|H_i, \alpha_i)p(H_i)+\sum_{j\neq i} p(X_{k-1}|H_j, O_{k-2})p(H_j) \quad (14)$$

and similarly $$p(X_{k-1}|O_{k-2})=\sum_j p(X_{k-1}|O_{k-2}, H_j)p(H_j) \quad (15)$$

so that equation (12) becomes $$p(\alpha_i|O_{k-1})=p(\alpha_i|O_{k-2})\left\{\frac{p(X_{k-1}|H_i, \alpha_i)p(H_i)+\sum_{j\neq i} p(X_{k-1}|H_j, O_{k-2})p(H_j)}{\sum_j p(X_{k-1}|H_j, O_{k-2})p(H_j)}\right\} \quad (16)$$

Thus by using Equation 16 as the distribution of the unknown parameter set in Equation 10, the required probability becomes $$p(X_k|H_i, O_{k-1})=\int_{\alpha_i} p(X_k|H_i, \alpha_i)p(\alpha_i|O_{k-2}) \left\{\frac{p(X_{k-1}|H_i, \alpha_i)p(H_i)+\sum_{j\neq i} p(X_{k-1}|H_j, O_{k-2})p(H_j)}{\sum_j p(X_{k-1}|H_j, O_{k-2})p(H_j)}\right\} d(\alpha_i) \quad (17)$$

The product of this probability and the a priori probability $p(H_i)$ is the basis for deciding which one of the hypotheses $H_i$ is true. If it is incorrectly decided that a particularly hypothesis $H_i$ is true, a loss will result. The loss associated with a particular decision $d_p$ that a particular hypothesis $H_p$ is true when a hypothesis $H_a$ is actually true may be represented as $$L(H_a, d_p) \quad (18)$$

the exact value of the loss being being dictated by the particular application. Thus, there is a risk $\rho(d_i)$ associated with making any particular decision $d_i$ (i.e., deciding that the hypothesis $H_i$ was true).

The average risk associated associated with making the decision $d_p$, when $X_k$ is observed, is $$\rho X_k(d_p)=\sum_{i=1}^{m} L(H_i, d_p)p(H_i|X_k) \quad (19)$$

An optimum decision system is herein defined as one which minimizes the average risk associated with the decision. In order to minimize $\rho X_k (d_p)$, Equation 19 may be rewritten as $$\rho X_k(d_p)=\sum_{i=1}^{m} L(H_i, d_p) \frac{p(X_k|H_i)p(H_i)}{p(X_k)} \quad (20)$$

Since $p(X_k)$ does not depend on either $i$ or $d_p$, it is sufficient to minimize the function $$\rho' X_k(d_p)=\sum_{i=1}^{m} L(H_i, d_p)p(X_k|H_i)p(H_i) \quad (21)$$

The system should make the computation of risk for each possible decision $d_p$, and make that decision which has the least average risk.

Referring now to the embodiment of FIGURE 10, probability computing means 301 operates on the input signal and generates an output which is the analog of the probability defined by Equation 7 and is the first term on the right of Equation 17.

Probability computing means 304 operates on the outputs of probability computing means 301 and 306 and generates an output which is the analog of the probability defined by the product of the other terms on the right of Equation 17 and the a priori probability $p(H_i)$.

The ouputs of probability computing means 301 and 304 are multiplied in multiplier 305. The product signal is operated on by probability computing means 306 which generates an output which is the analog of the product of the probability defined by Equation 17 and the a priori probability $p(H_i)$.

Decision circuit 303 operates on the output of probability computing means 306 and computes the analog of the risks defined by Equation 21. The decision circuit compares these risks which are associated with each possible decision and generates an output associated with the smallest risk, indicating which of the hypotheses is most probably true.

Referring to the embodiment of FIGURES 6A, B and C, the outputs of the various elements are analog representations of the following expressions.

Probability computer 103

$$p(X_k|H_i, \alpha_i) \quad (22)$$

Potentiometer 172, 172'

$$p(H_i) \quad (23)$$

Multiplier 171

$$p(X_k|H_i, \alpha_i)p(H_i) \quad (24)$$

Delay device 25

$$p(X_{k-1}|H_i, \alpha_i)p(H_i) \quad (25)$$

Multiplier 35

$$p(\alpha_i|O_{k-1})=\text{Equation 16} \quad (26)$$

Summation circuit 46 and sample hold circuit 47

$$\text{Equation 17} \quad (27)$$

Multiplier 178 and learning loop 105

$$[p(H_i)][\text{Equation 17}] \quad (28)$$

Adder 181

$$\sum_{j} p(X_{k-1}|H_j,O_{k-2})\, p(H_j) \quad (29)$$

Difference circuit 183

$$\sum_{j\neq i} p(X_{k-1}|H_j,O_{k-2})p(H_j) \quad (30)$$

Adder 175

$$p(X_{k-1}|H_i,\alpha_i)p(H_i) + \sum_{j\neq i} p(X_{k-1}|H_j,O_{k-2})p(H_j) \quad (31)$$

Divider 32

$$\frac{p(X_{k-1}|H_i,\alpha_i)p(H_i)+\sum_{j\neq i}p(X_{k-1}|H_j,O_{k-2})p(H_j)}{\sum_{j} p(X_{k-1}|H_j,O_{k-2})} \quad (32)$$

Delay device 42

$$p(\alpha_i|O_{k-2}) \quad (33)$$

Multiplier 35

$$p(\alpha_i|O_{k-1})=\text{Equation 16} \quad (34)$$

Summation circuits 207, 208, 209

$$\sum_{\substack{j=1 \\ j\neq i}}^{m} L(H_j,d_i)p(X_k|H_j)p(H_j) \quad (35)$$

GLOSSARY $\alpha_i$—values of the parameter set $A_i$ of class $i$ $a$—amplitude parameter $A_i$—parameter set of class $i$ $d_p$—the decision hypothesis $H_p$ is true E(. . .)—expected value $H_a$—a particular hypothesis $H_i$—the hypothesis that the input pattern belongs to the class $i$ $i$—(subscript) designates individual classes of the $m$ classes $j$—(subscript) designates individual classes of the $m$ classes ($j$ may or may not equal $i$)

L—loss function $m$—the number of prescribed signals or classes $O_{k-1}$—the sequence of prior observations $$X_1, X_2, \ldots X_{k-1}$$

$\omega$—frequency parameter $p$(. . .)—probability or probability density $\rho_{X_k}(d_p)$—the average risk associated with making the decision $d_p$, when $X_k$ is observed $\theta$—phase parameter $X_k$—the $k$th observation of the input signal (the current observation)

$X_{k-1}$—the $k-1$th observation of the input signal

What is claimed is:

1. In apparatus for identifying in an observation unit $q$ an input signal a prescribed signal having a predetermined parameter of unknown value, an adaptive system comprising means for dividing the input signal into a succession of separate timed observation units of equal duration, and a learning loop comprising a probability computer receiving the output of said dividing means and having means for automatically relating each observation unit with an immediately preceding observation unit and deriving an output which is the analog of the probability that said predetermined parameter has a determined value, conditioned on information obtained from all prior observation units, a multiplier connected to the outputs of said dividing means and said probability computer and producing a product output, and a likelihood computer connected to the output of said multiplier and deriving an output at the end of each observation unit which is the analog of likelihood that a prescribed signal having said predetermined parameter of said determined value would produce the current observation unit, conditioned on information obtained from all prior observation units.

2. The system according to claim 1 in which said likelihood computer comprises a summation circuit for integrating the output of said multiplier for each observation unit, and a sample-hold circuit responsive to the operation of said summation circuit at the end of each observation unit for sensing and storing the integrated multiplier output.

3. The system according to claim 1 wherein said dividing means comprises a periodogram calculator responsive to the input signal for generating an analog of the density distribution of the input signal as a function of values of said parameter, and means for accentuating the larger values of the output of said periodogram calculator.

4. An adaptive system for identifying in an input signal a prescribed signal having a predetermined parameter of unknown value comprising means for dividing the input signal into a succession of timed observation units of equal duration, a learning loop comprising a first computer receiving the output of said dividing means and having a divider circuit and a multiplier circuit, said divider circuit dividing signals occurring during an observation unit immediately preceding a current observation unit by a reference signal and deriving a normalized output, said multiplier circuit being connected to the output of said divider circuit and being operative to multiply signals occurring during immediately successive observation units for deriving an output proportional to the probability that said predetermined parameter has a determined value, conditioned on information obtained from all prior observation units, a multiplier connected to the output of said dividing means and said multiplier circuit of the first computer and producing a product output, and a second computer receiving said product output and deriving an output at the end of each observation unit which is the analog of the probability that a signal having said predetermined parameter of said determined value would produce the current observation unit, conditioned on information obtained from all prior observation units, the output of the second computer comprising said reference signal in said first computer, and a decision circuit receiving the output of said second computer and responsive to the magnitude thereof for indicating the presence of the prescribed signal in the current observation unit of the input signal.

5. The system according to claim 4 with means for delaying a portion of the output of said multiplier circuit for a period of one observation unit to derive one input to said multiplier circuit, the other input to said multiplier circuit consisting of said divider circuit output.

6. An adaptive system for classifying a current observation of an input signal as one of a plurality of classes of signals having known forms by determining for the hypothesis for each class that a prescribed signal would produce the current observation of the input signal and determining the hypothesis having the greater probability of being true, said system comprising means responsive to the current observation of the input signal for computing for each class outputs representative of the probability that a prescribed signal from the class would produce the current observation of the observed input signal, conditioned on information obtained from prior observations of input signals, and satisfying the relationship $$\int_{\alpha_i} p(X_k|H_i,\alpha_i)p(\alpha_i|O_{k-2}) \left\{\left[\frac{\sum_{j\neq i} p(X_{k-1}|H_j,O_{k-2})p(H_j) + p(X_{k-1}|\alpha_i,H_i)p(H_i)}{\sum_{j} p(X_{k-1}|H_j,O_{k-2})p(H_j)}\right]\right\} d(\alpha_i)$$

wherein $p(\ldots)$ represents probability, $X_k$ represents the $k$th or current observation of the input signal, $X_{k-1}$ represents the $k-1$th observation of the input signal, $H_i$ represents the hypothesis associated with class $i$, $A_i$ represents the parameter set associated with class $i$, $\alpha_i$ represents values of the parameter set $A_i$, $O_{k-2}$ represents $k-2$ prior observations of the input signal, and $H_j$ represents the hypothesis designated by the subscript index $j$, and decision circuit means responsive to outputs of said computing means for determining which probability is the largest and deciding which hypothesis is more probably true.

7. The system according to claim 6 wherein said decision circuit means comprises a risk calculator responsive to the outputs of said computing means for determining the risk associated with deciding that each hypothesis is true, and comparator means responsive to the outputs of said risk calculator for determining which hypothesis has the smallest associated risk and deciding which hypothesis is true.

8. The system according to claim 7 wherein the outputs of said risk calculator satisfy the relationship $$\sum_{\substack{j=1\\j\neq i}}^{m} L(H_j, d_i)p(X_k|H_j)p(H_j)$$

where L represents loss and $d_i$ represents a particular decision that a particular hypothesis $H_i$ is true.

9. A system for classifying an input signal as being generated by a prescribed signal from the $i$th class of $m$ classes of known form by determining for all $i$ which hypothesis $H_i$ is true, the hypothesis $H_i$ being the hypothesis that the prescribed signal defined by the associated parameter set $A_i$ would produce the input signal, said system comprising first computing means responsive to the input signal for converting the input signal to a sequence of observations $X_1, X_2, \ldots X_k$, where $X_k$ is the $k$th or current observation, each observation being of time duration T, said first computing means providing during each observation an output representative of the values, for all $i$, of $p(X_k|H_i, \alpha_i)$, the probability that a prescribed signal from each class $i$ would produce the observed input signal $X_k$ when the associated parameter set $A_i$ has the value $\alpha_i$, said output being independent of probability information obtained during prior observations of the input signal, a first adder having a plurality of inputs and an output, learning loop means having first inputs connected to said output of said first computing means, and having second inputs connected to said output of said first adder, and having outputs connected to respective inputs of said first adder, said outputs of said learning loop means being respectively representative of values of $p(X_k|H_i, O_{k-1})$, the probability that a signal from each class $i$ would produce the observed input signal $X_k$, conditioned on probability information obtained during the $k-1$ prior observations $(O_{k-1})$ of the input signal, and decision circuit means having inputs connected to respective outputs of said learning loop means, said decision circuit means deciding which hypothesis $H_i$ is true, said outputs of said learning loops being independent of decisions made by said decision circuit means.

10. The system according to claim 9 wherein said learning loop means comprises first multiplier means having $m$ first inputs each connected to the output of said first computing means, $m$ second inputs and $m$ outputs, second computing means having $m$ first inputs each connected to the output of said first computing means, $m$ second inputs each connected to the output of said first adder, $m$ third inputs and $m$ outputs connected to respective second inputs to said first multiplier means, said second computing means computing during each observation $m$ outputs representative of values of $p(\alpha_i|O_{k-1})$, the probability density distribution of the parameter set $A_i$, conditioned on information obtained from the prior $k-1$ observations $(O_{k-1})$, and third computing means having $m$ first inputs connected to respective outputs of said first multiplier means and $m$ outputs connected to respective inputs of said first adder and to respective inputs to said decision circuit means, said third computing means computing during each observation values of the *a* priori probability $p(H_i)$ (for all $i$) that the hypothesis $H_i$ is true and values for the probability $p(X_k|H_i, O_{k-1})$ (for all $i$) that a prescribed signal from each class $i$ would produce the observed input signal $X_k$, conditioned on information obtained from the prior $k-1$ observations $(O_{k-1})$, said third computing means outputs satisfying the relationship $p(H_i)p(X_k|H_i, O_{k-1})$.

11. The system according to claim 10 wherein said third computing means comprises summation means having $m$ inputs connected to respective outputs of said first multiplying means and having $m$ outputs, said summation means summing during each observation the respective product outputs of said first multiplier means, sample-hold circuit means having $m$ inputs connected to respective outputs of said summation means, and having $m$ outputs, said sample-hold circuit means sampling at the end of each observation and holding constant for the subsequent observation respective outputs of said summation means, first generating means having $m$ outputs for generating the *a* priori probability $p(H_i)$ (for each $i$) that the hypothesis $H_i$ is true, and second multiplier means having $m$ first inputs connected to respective outputs of said sample-hold circuit means and $m$ second inputs connected to respective outputs of said first generating means and $m$ outputs connected to respective inputs to said first adder and said decision circuit means.

12. The system according to claim 10 wherein said second computing means comprises first generating means generating the a priori probability $p(H_i)$ (for all $i$) that the hypothesis $H_i$ is true and having $m$ outputs, third multiplier means having $m$ first inputs connected to the output of said first computing means, $m$ second inputs connected to respective outputs of said first generating means and having $m$ outputs, first delay means having $m$ inputs connected to respective outputs of said third multiplier means and having $m$ outputs, said first delay means delaying the product outputs of said third multiplier means for a predetermined time corresponding to one observation of the input signal, second adder means having $m$ first inputs connected to respective outputs of said first delay means and having $m$ second inputs and $m$ outputs, difference generating means having $m$ first inputs connected to said output of said first adder, $m$ second inputs connected to respective outputs of said third computing means and $m$ outputs connected to respective second inputs to said second adder means, divider means having $m$ first inputs connected to respective outputs of said summation circuit means, $m$ second inputs connected to said output of said first adder, and $m$ outputs, fourth multiplying means having $m$ first inputs connected to respective outputs of said divider means and having $m$ second inputs and $m$ outputs, second delay means having $m$ inputs responsive to respective outputs of said fourth multiplier means and $m$ outputs connected to respective second inputs to said fourth multiplier means, said second delay means delaying the output of said fourth multiplier means for a predetermined time corresponding to one observation of the input signal, and means for connecting respective outputs of said fourth multiplier means to respective second inputs to said first multiplier means.

13. The system according to claim 9 wherein said decision circuit means comprises a risk calculator comprising second generating means having a plurality of outputs, said second generating means generating losses associated with making particular decisions $d_i$ that hypothesis $H_i$ is true when each hypothesis $H_j$ $(j \neq i)$ is actually true (for all $i$), fifth multiplier means having a plurality of first inputs connected to respective outputs of said learning loop means, a plurality of second inputs connected to respective outputs of said second generating means and a plurality of outputs, said fifth multiplier means multiplying the losses associated with making particular decisions $d_i$ that hypothesis $H_i$ is true when each hypothesis $H_j$ $(j \neq i)$ is actually true and the respective probability that a signal from each respective class $j$ would produce the observed input signal $X_k$, conditioned on probability information obtained from the $k-1$ prior observations $(O_{k-1})$ of the input signal, and third adder means responsive to respective outputs of said fifth multiplier means and having $m$ outputs, said third adder means summing (for each $i$) the product outputs associated with making decisions that each hypothesis $H_i$ is true, and comparator means having a plurality of inputs connected to respective outputs of said third adder means for determining which of said $m$ outputs is smallest and deciding which hypothesis $H_i$ is true.

14. The system according to claim 13 wherein the outputs of said second generating means satisfy the relationship $$L(H_j,d_i)$$

the outputs of said fifth multiplier means satisfy the relationship $$L(H_j,d_i)p(X_k|H_j,O_{k-1})p(H_j)$$

and the output of said third adder means satisfies the relationship.

$$\sum_{\substack{i=1 \\ j\neq i}}^{m} L(H_j, d_i)p(X_k|H_j, O_{k-1})p(H_j)$$

where L is loss.

15. A system for classifying an input signal as being generated by a prescribed signal from the $i$th class of $m$ classes of known form by determining for all $i$ which hypothesis $H_i$ is true, the hypothesis $H_i$ being the hypothesis that the prescribed signal defined by the associated parameter set $A_i$ would produce the input signal, said system comprising first computing means having an input, means for applying the input signal to said input to said first computing means, said first computing means converting the input signal to a sequence of observations $X_1, X_2, \ldots X_k$, where $X_k$ is the $k$th or current observation, each observation being of time duration T, said first computing means providing during each observation an output representative of the probability that a signal from each class $i$ would produce the observation $X_k$ when the associated parameter set $A_i$ has the value $\alpha_i$, a first adder having $m$ inputs and an output,

*m* learning loops, each of said learning loops comprising first generating means for generating the a priori probability that an associated hypothesis $H_i$ is true, a first multiplier having a first input connected to the output of said first computing means, a second input connected to the output of said first generating means and having an output, a first delay device for delaying the output of said first multiplier for one time duration T, a second adder having a first input connected to the output of said first delay device and having a second input and an output, a second multiplier having a first input connected to the output of said first computing means and having a second input and output, means for summing the output of said second multiplier during each observation T, means for sampling and holding constant for one observation the output of said summation circuit at the end of each observation, a third multiplier having a first input connected to the output of said first generating means, a second input connected to the output of said sampling means and an output connected to an associated input to said first adder, a difference circuit having a first input connected to the output of said third multiplier, a second input connected to the output of said first adder and an output connected to the second input to said second adder, a divider having a first input connected to the output of said first adder, a second input connected to the output of said second adder and having an output, a fourth multiplier having a first input connected to the output of said divider, a second input and an output electrically connected to the second input to said second multiplier, a second delay device having an input connected to the output of said fourth multiplier and having an output connected to the second input to said fourth multiplier, said second delay device delaying the output of said fourth multiplier for one observation T, a risk calculator having *m* inputs, each of said inputs being connected to the output of said third multiplier of an associated learning loop, said risk calculator determining the risk associated with deciding that each hypothesis $H_i$ is true, and means for comparing the risks calculated by said risk calculator for determining which hypothesis $H_i$ has the smallest associated risk and deciding which hypothesis $H_i$ is true.

16. A system for classifying an input signal as being generated by a prescribed signal from the *i*th class of *m* classes of known form by determining for all *i* which hypothesis $H_i$ is true, the hypothesis $H_i$ being the hypothesis that the prescribed signal defined by the associated parameter set $A_i$ would produce the input signal, said system comprising first computing means having an input, means for applying the input signal to said input to said first computing means, said first computing means converting the input signal to a sequence of observations $X_1$, $X_1$, . . . $X_k$, where $X_k$ is the *k*th or current observation, each observation being of time duration T, said first computing means providing during each observation an output representative of the probability that a signal from each class *i* would produce the observation $X_k$ when the associated parameter set $A_i$ has the value $\alpha_i$, said output satisfying the relationship $$p(X_k|H_i\alpha_i)$$

a first adder having *m* inputs and an output,

*m* learning loops, each of said learning loops comprising first generating means for generating the a priori probability $p(H_i)$ that an associated hypothesis $H_i$ is true, a first multiplier having a first input connected to the output of said first computing means, a second input connected to the output of said first generating means and having an output satisfying the relationship $$p(X_k|H_i,\alpha_i)p(H_i)$$

a first delay device for delaying the output of said first multiplier for one time duration T, the output of said first delay device satisfying the relationship $$p(X_{k-1}|H_i,\alpha_i)p(H_i)$$

a second adder having a first input connected to the output of said first delay device, a second input satisfying the relationship $$\sum_{j\neq i} p(X_{k-1}|H_j, O_{k-2})p(H_j)$$

and an output satisfying the relationship $$p(X_{k-1}|H_i, \alpha_i)p(H_i)+\sum_{j\neq i} p(X_{k-1}|H_j, O_{k-2})p(H_j)$$

a second multiplier having a first input connected to the output of said first computing means and having a second input satisfying the relationship $$p(\alpha_i|O_{k-1})$$

and an output satisfying the relationship $$p(X_k|H_i,\alpha_i)p(\alpha_i|O_{k-1})$$

means for summing the output of said second multiplier during each observation T, the sum signal satisfying the relationship $$p(X_k|H_i, O_{k-1})=\int_{\alpha_i} p(X_k|H_i, \alpha_i)p(\alpha_i|O_{k-2}) \left[\frac{p(X_{k-1}|H_i, \alpha_i)p(H_i)+\sum_{j\neq i} p(X_{k-1}|H_j, O_{k-2})p(H_j)}{\sum_{j} p(X_{k-1}|H_j, O_{k-2})p(H_j)}\right] d(\alpha_i)$$

means for sampling and holding constant for one observation the output of said summation circuit at the end of each observation, the output held constant during the subsequent observation satisfying the relationship $$p(X_{k-1}|H_i,O_{k-2})$$

a third multiplier having a first input connected to the output of said first generating means, a second input connected to the output of said sampling means and and output satisfying the relationship $$p(X_{k-1}|H_i,O_{k-2})p(H_i)$$

said output being applied to an associated input to said first adder, the output of said first adder satisfying the relationship $$\sum_{j\neq i} p(X_{k-1}|H_j, O_{k-2})p(H_j)+p(X_{k-1}|H_i, O_{k-2})p(H_i)$$

a difference circuit having a first input connected to the output of said third multiplier, a second input connected to the output of said first adder and an output connected to the second input to said second adder, said output satisfying the relationship $$\sum_{j\neq i} p(X_{k-1}|H_j, O_{k-2})p(H_j)$$

a divider having a first input connected to the output of said first adder, a second input connected to the output of said second adder and having an output satisfying the relationship $$\frac{p(X_{k-1}|H_i, \alpha_i)p(H_i)+\sum_{j\neq i} p(X_{k-1}|H_j, O_{k-2})p(H_j)}{\sum_{j} p(X_{k-1}|H_j, O_{k-2})p(H_j)}$$

a fourth multiplier having a first input connected to the output of said divider, a second input satisfying the relationship $$p(\alpha_i|O_{k-2})$$

and an output electrically connected to the second input to said second multiplier, said output satisfying the relationship $$p(\alpha_i|O_{k-1})=p(\alpha_i|O_{k-2})\left\{\frac{p(X_{k-1}|H_i,\alpha_i)p(H_i)+\sum_{j\neq i}p(X_{k-1}|H_j,O_{k-2})p(H_j)}{\sum_j p(X_{k-1}|H_j,O_{k-2})p(H_j)}\right\}$$

a second delay device having an input connected to the output of said fourth multiplier and having an output connected to the second input to said fourth multiplier, said second delay device delaying the output of said fourth multiplier for one observation T, the output of said second delay device satisfying the relationship $$p(\alpha_i|O_{k-2})$$

a risk calculator having $m$ inputs, each of said inputs being connected to the output of said third multiplier of an associated learning loop, said risk calculator determining the risk associated with deciding that each hypothesis $H_i$ is true, the output of said risk calculator satisfying the relationship $$\sum_{\substack{i=1\\i\neq j}}^{m} L(H_j,d_i)p(X_k|H_i,O_{k-1})p(H_i)$$

and means for comparing the risks calculated by said risk calculator for determining which hypothesis $H_i$ has the smallest associated risk and deciding which hypothesis $H_i$ is true.

17. The system according to claim 12 wherein said last named means comprises third generating means for generating, for all $i$, the a priori probability distribution $p(\alpha_i)$ of values $\alpha_i$ of said parameter sets $A_i$, said third generating means having $m$ outputs, and gating means having $m$ first inputs connected to respective outputs of said fourth multiplying means, $m$ second inputs connected to respective outputs of said third generating means and $m$ outputs connected to respective second inputs of said first multiplier means and to respective inputs to said second delay means, said gating means passing the outputs of said third generating means during the first observation $X_1$ and passing the output of said fourth multiplier means during successive observations of the input signal.

References Cited

UNITED STATES PATENTS

| | | | |
|---|---|---|---|
| 3,381,274 | 4/1968 | Quade et al. | 340—146.3 |
| 2,978,675 | 4/1961 | Highleyman | 340—149 |
| 3,222,650 | 12/1965 | Lazarus | 340—172.5 |
| 3,233,219 | 2/1966 | Atrubin et al. | 340—146.3 |
| 3,267,431 | 8/1966 | Greenberg et al. | 340—146.3 |

MAYNARD R. WILBUR, Primary Examiner

ROBERT F. GNUSE, Assistant Examiner

U.S. Cl. X.R.

324—77